(12) United States Patent
Yao et al.

(10) Patent No.: US 12,580,230 B2
(45) Date of Patent: Mar. 17, 2026

(54) POROUS ELECTROCHEMICALLY ACTIVE-MATERIAL STRUCTURES WITH DISPERSED INERT ELEMENTS

(71) Applicant: Gru Energy Lab Inc., San Jose, CA (US)

(72) Inventors: Xiahui Yao, San Jose, CA (US); Xiaohua Liu, Mountain View, CA (US); Sa Zhou, San Jose, CA (US); Song Han, Foster City, CA (US)

(73) Assignee: GRU Energy Lab Inc., San Jose, CA (US)

( * ) Notice: Subject to any disclaimer, the term of this patent is extended or adjusted under 35 U.S.C. 154(b) by 0 days.

(21) Appl. No.: 18/914,584

(22) Filed: Oct. 14, 2024

(65) Prior Publication Data

US 2025/0125428 A1 Apr. 17, 2025

Related U.S. Application Data

(60) Provisional application No. 63/665,848, filed on Jun. 28, 2024, provisional application No. 63/590,342, filed on Oct. 13, 2023.

(51) Int. Cl.
*H01M 10/42* (2006.01)
*H01M 4/38* (2006.01)
(Continued)

(52) U.S. Cl.
CPC ....... *H01M 10/4235* (2013.01); *H01M 4/386* (2013.01); *H01M 4/621* (2013.01); *H01M 4/628* (2013.01); *H01M 10/0525* (2013.01)

(58) Field of Classification Search
None
See application file for complete search history.

(56) References Cited

U.S. PATENT DOCUMENTS 7,871,727 B2 1/2011 Obrovac et al.
9,601,228 B2 3/2017 Deng et al.
(Continued)

FOREIGN PATENT DOCUMENTS

CN 105098148 A 11/2015
CN 114551886 A 5/2022
(Continued)

OTHER PUBLICATIONS

Vichery et al., Stabilization mechanism of electrodeposited silicon thin films, 2014, 16, 22222-22228. (Year: 2014).*
(Continued)

*Primary Examiner* — Zhongqing Wei
(74) *Attorney, Agent, or Firm* — Polygon IP, LLP

(57) ABSTRACT

Described herein are electrochemically active-material structures comprising silicon and one or more inert elements, such that these inert elements are chemically and/or atomically dispersed. Also described are negative battery electrodes and lithium-ion electrochemical cells comprising such electrochemically active-material structures as well as methods of fabricating such structures, electrodes, and lithium-ion electrochemical cells. Some examples of atomically-dispersed inert elements include, but are not limited to, hydrogen (H), carbon (C), nitrogen (N), and chlorine (Cl). Unlike silicon, inert elements do not interact with lithium at an operating voltage of the negative battery electrode and therefore do not contribute to the overall cell capacity. At the same time, these inert elements help to mitigate silicon swelling by operating as a mechanical buffer, support structure, and/or additional conductive pathways. Such electrochemically active-material structures can be formed by reacting (chemically or electrochemically) one or more precursors that include silicon and corresponding inert elements.

19 Claims, 9 Drawing Sheets

(51) Int. Cl.
  *H01M 4/62* (2006.01)
  *H01M 10/0525* (2010.01)

(56) References Cited

U.S. PATENT DOCUMENTS

| | | |
|---|---|---|
| 9,947,922 B2 | 4/2018 | Yoo et al. |
| 10,797,303 B2 | 10/2020 | Cho et al. |
| 11,069,885 B2 | 7/2021 | Zoitos et al. |
| 2004/0137327 A1 | 7/2004 | Gross et al. |
| 2014/0057179 A1 | 2/2014 | Yushin et al. |
| 2014/0144784 A1 | 5/2014 | Lee et al. |
| 2020/0006804 A1 | 1/2020 | Zhang et al. |

FOREIGN PATENT DOCUMENTS

| | | |
|---|---|---|
| EP | 4112548 A1 | 1/2023 |
| GB | 2055400 A | 3/1981 |
| KR | 101927414 B1 | 12/2018 |

OTHER PUBLICATIONS

Huang et al., "Electrochemical characteristics of amorphous silicon carbide film as a lithium-ion battery anode," RSC Adv., Jan. 2018, 8, 5189-5196.

Huang et al., "Synthesis of Silicon Oxycarbide Beads from Alkoxysilane as Anode Materials for Lithium-Ion Batteries," ACS Omega Jan. 2023, 8, 4, 4165-4175.

Nava et al., "Silicon-Core-Carbon-Shell Nanoparticles for Lithium-ion Batteries: Rational Comparison Between Amorphous and Graphitic Carbon Coatings," Nano Lett. Sep. 2019, 19, 10, 7236-7245.

Tong et al., "Magnetic sputtered amorphous Si/C multilayer thin films as anode materials for lithium ion batteries," Journal of Power Sources 247, Feb. 2014, 78-83.

U.S. Appl. No. 18/914,577, Non Final Office Action mailed Feb. 12, 2025, 29 pgs.

U.S. Appl. No. 18/914,577, Restriction Requirement mailed Jan. 10, 2025, 6 pgs.

Gobet et al. (Electrodeposition of Silicon from a Nonaqueous Solvent, Jourunal of The Electrochemical Society, 1988) (Year: 1988).

International Application Serial No. PCT/US24/51208, Search Report and Written Opinion mailed Jan. 24, 2025, 10 pgs.

Libre Texts (20.9: Electrolysis) (Year: 2025).

LibreTexts (Standard Reduction Potentials by Element) (Year: 2025).

Munisamy et al. (Electrodeposition of Si from organic solvents and studies related to initial stages of Si growth, Electrochemica Acta, 2010) (Year: 2010).

Unacademy (Washing, Drying, and Ignition of the Precipitate) (Year: 2025).

* cited by examiner

400

Provide one or more precursors (e.g., form solution/electrolyte)  410

React (chemically/electrochemically) one or more precursors / form electrochemically active-material structures  420

Harvest electrochemically active-material structures from solution 430

Heat treat electrochemically active-material structures 440

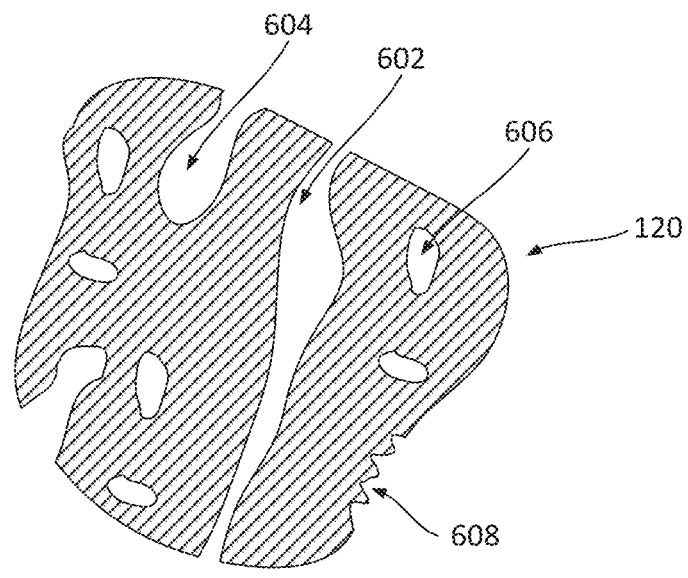
*FIG. 6A*
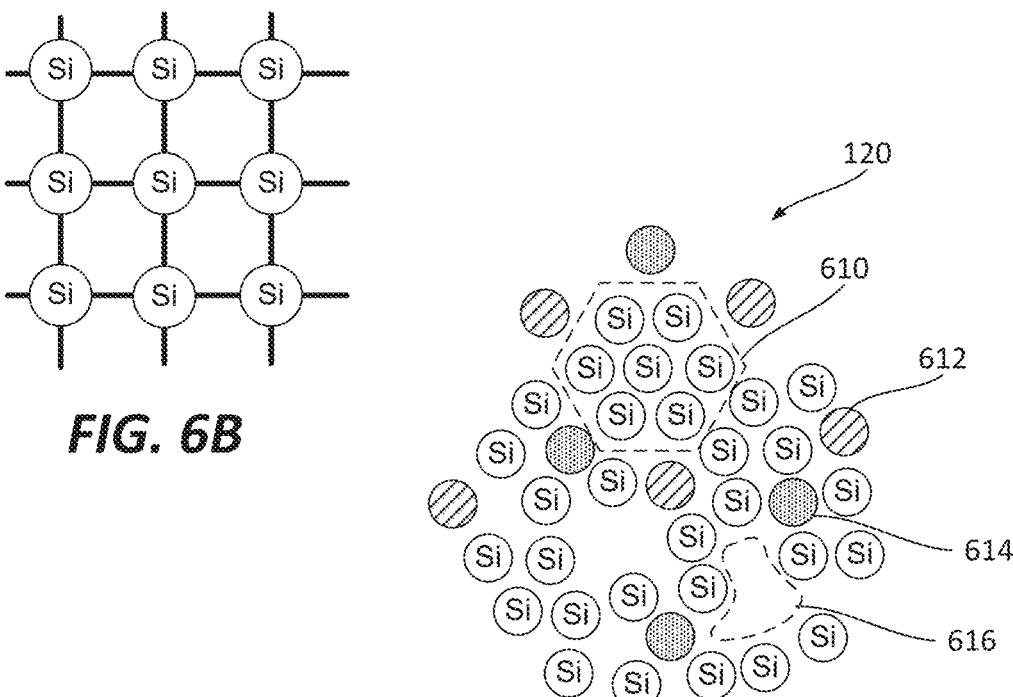
*FIG. 6B*
*FIG. 6C*

POROUS ELECTROCHEMICALLY ACTIVE-MATERIAL STRUCTURES WITH DISPERSED INERT ELEMENTS

CROSS-REFERENCE TO RELATED APPLICATIONS

This application claims the benefit under 35 U.S.C. § 119(e) of U.S. Provisional Patent Application 63/590,342, filed on 2023 Oct. 13, and U.S. Provisional Patent Application 63/665,848, filed on 2024 Jun. 28, both of which are incorporated herein by reference in their entirety for all purposes.

BACKGROUND

Graphite is the most widely adopted negative electrode active material for lithium-ion batteries. However, with the increasing demand for higher energy density to be provided by lithium-ion batteries, the specific capacity and volumetric capacity provided by graphite materials can't meet such demand. High-capacity materials, such as silicon, are very desirable for various battery applications because of their high gravimetric and volumetric capacities. However, many high-capacity materials undergo significant volume changes during charge-discharge cycling (e.g., incorporation-removal of lithium ions). The repeated cycling and corresponding volume changes can cause pulverization of these materials and/or loss of electrical connections between these materials and other electrode components. Conventional integration of high-capacity materials into electrodes typically results in high irreversible capacity losses, excessive solid electrolyte interphase (SEI) formation, and losses of electrical contacts within electrodes formed from these materials, all of which are highly undesirable. These issues have limited the application of high-capacity active materials in batteries.

What is needed are electrochemically active-material structures comprising silicon and/or other high-capacity materials capable of withstanding repeated charge-discharge cycling while maintaining the integrity and performance of the electrodes.

SUMMARY

Described herein are electrochemically active-material structures comprising silicon and one or more inert elements, chemically dispersed in these electrochemically active-material structures. Also described are negative battery electrodes and lithium-ion electrochemical cells comprising such electrochemically active-material structures as well as methods of fabricating such structures, electrodes, and lithium-ion electrochemical cells. Some examples, of chemically-dispersed inert elements include, but are not limited to, hydrogen (H), carbon (C), nitrogen (N), oxygen (O), and chlorine (Cl). Unlike silicon, inert elements do not interact with lithium at an operating voltage of the negative battery electrode and therefore do not contribute to the overall cell capacity. At the same time, these inert elements help to mitigate silicon swelling by operating as a mechanical buffer, support structure, and/or additional conductive pathways. Such electrochemically active-material structures can be formed by reacting (chemically or electrochemically) one or more precursors that include silicon and corresponding inert elements. Electrochemically active-material structures may further comprise pores that reduce the skeletal density and help to accommodate the swelling during the lithiation of silicon.

Clause 1. An electrochemically active-material structure for use in lithium-ion batteries, the electrochemically active-material structure comprising silicon in one or more of an amorphous structure and a polycrystalline structure; and one or more inert elements selected from the group consisting of carbon (C), an additive element (M), oxygen (O), and a halogen (X) such that the electrochemically active-material structure has a composition represented by $SiC_aM_bO_cX_d$ and such that $a>0$ and $c>0$, wherein the one or more inert elements are chemically dispersed in the electrochemically active-material structure such that the electrochemically active-material structure is a single-phase structure through an entire volume of the electrochemically active-material structure without forming a separate phase comprising the one or more inert elements.

Clause 2. The electrochemically active-material structure of clause 1, wherein the single-phase structure is a polycrystalline structure consisting of domains less than 5 nm in size.

Clause 3. The electrochemically active-material structure of clause 1, wherein the single-phase structure is amorphous.

Clause 4. The electrochemically active-material structure of clause 1, wherein the electrochemically active-material structure comprises one or more closed pores and atomic vacancies such that the electrochemically active-material structure has a skeletal density of between 0.5 to 2.3 g/cm3.

Clause 5. The electrochemically active-material structure of clause 1, wherein the electrochemically active-material structure has a lithium delithiation capacity between 1300 to 3800 mAh/g when delithiated to 2.0V vs Li+/Li after a full lithiation to 5 mV vs Li+/Li.

Clause 6. The electrochemically active-material structure of clause 1, wherein a weight percentage of the silicon in the electrochemically active-material structure is between 9% to 95%.

Clause 7. The electrochemically active-material structure of clause 1, wherein: $0.01 \leq a \leq 0.5$ in $SiC_aM_bO_cX_d$, and $0.01 \leq c \leq 0.5$ in $SiC_aM_bO_cX_d$.

Clause 8. The electrochemically active-material structure of clause 1, wherein: $0.01 \leq a \leq 10$ in $SiC_aM_bO_cX_d$, and $0.01 \leq Sc \leq 2$ in $SiC_aM_bO_cX_d$.

Clause 9. The electrochemically active-material structure of clause 1, wherein the additive element (M) in $SiC_aM_bO_cX_d$ is one or more metal elements selected from the groups consisting of magnesium (Mg), aluminum (Al), titanium (Ti), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), tantalum (Ta), lanthanum (La), sodium (Na), and potassium (K).

Clause 10. The electrochemically active-material structure of clause 1, wherein the additive element (M) in $SiC_aM_bO_cX_d$ is one or more dopants selected from the group consisting of hydrogen (H), boron (B), nitrogen (N), phosphorus (P), sulfur (S), arsenic (As), and telluride (Te).

Clause 11. The electrochemically active-material structure of clause 1, wherein $0.01 \leq b \leq 0.1$ in $SiC_aM_bO_cX_d$.

Clause 12. The electrochemically active-material structure of clause 1, wherein the halogen (X) in $SiC_aM_bO_cX_d$ comprises one or more halogen elements selected from the group consisting of fluorine (F), chlorine (Cl), bromine (Br), and iodine (I).

Clause 13. The electrochemically active-material structure of clause 1, wherein $0.01 \leq d \leq 0.1$ in $SiC_aM_bO_cX_d$.

Clause 14. The electrochemically active-material structure of clause 1, wherein: $0.01 \leq a \leq 10$ in SiCaMbOcXd, $0 \leq b \leq 0.2$ in SiCaMbOcXd, $0.01 \leq c \leq 2$ in SiCaMbOcXd, and $0.01 \leq d \leq 0.1$ in SiCaMbOcXd.

Clause 15. The electrochemically active-material structure of clause 1, wherein an atomic percentage of the silicon in the electrochemically active-material structure is between 50% to 95%.

Clause 16. The electrochemically active-material structure of clause 1, wherein a total atomic percentage of all the inert elements is lower than 91% in any 1 nm by 1 nm by 1 nm portion of the entire volume.

Clause 17. The electrochemically active-material structure of clause 1, wherein an atomic percentage of the silicon in the electrochemically active-material structure is between 9% to 50%.

Clause 18. The electrochemically active-material structure of clause 1, wherein an atomic percentage of the silicon is higher than 9% in any 1 nm by 1 nm by 1 nm portion of the entire volume.

Clause 19. The electrochemically active-material structure of clause 1, wherein the electrochemically active-material structure has at least one Raman shift selected from a group of 450-470 cm−1 and 515-525 cm−1.

Clause 20. An electrochemically active-material structure for use in lithium-ion batteries, the electrochemically active-material structure comprising silicon in one or more of an amorphous structure and a polycrystalline structure; and one or more inert elements selected from the group consisting of carbon (C), an additive element (M), oxygen (O), and a halogen (X) such that the electrochemically active-material structure has a composition represented by SiCaMbOcXd and such that d>0 and at least one of a>0 and c>0.

BRIEF DESCRIPTION OF THE DRAWINGS

FIG. 6A is a schematic illustration of an electrochemically active-material structure showing various pore types, e.g., open pores, closed pores, and through pores.

FIG. 6B is a schematic illustration of the atomic structure of pure silicon in a crystalline form, as a comparison to the active material structure in FIG. 6C.

FIG. 6C is a schematic illustration of the material within the solid portion other than the pores, in which inert atoms, atomic vacancies, amorphous atomic structures, and small silicon domains.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

Figure 1A:
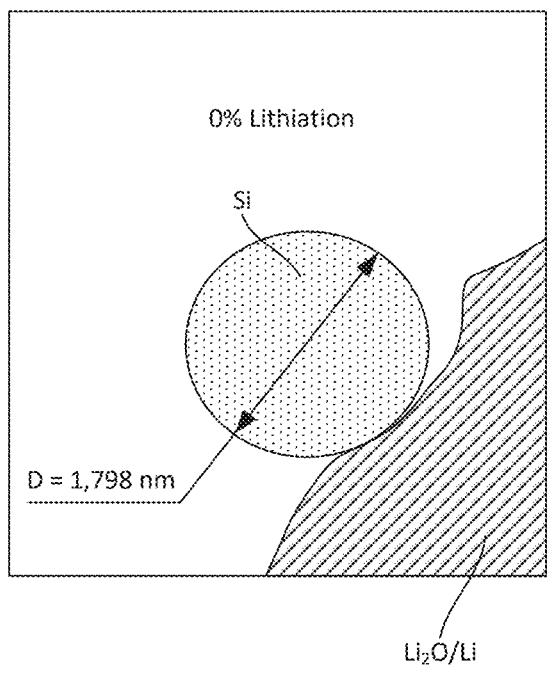
FIGS. 1A and 1B are schematic reproductions of the transmission electron microscope (TEM) images illustrating a 1.8-micron silicon structure disintegrated due to the lithiation (to a full lithiation capacity), in accordance with some examples.
Figure 1B:
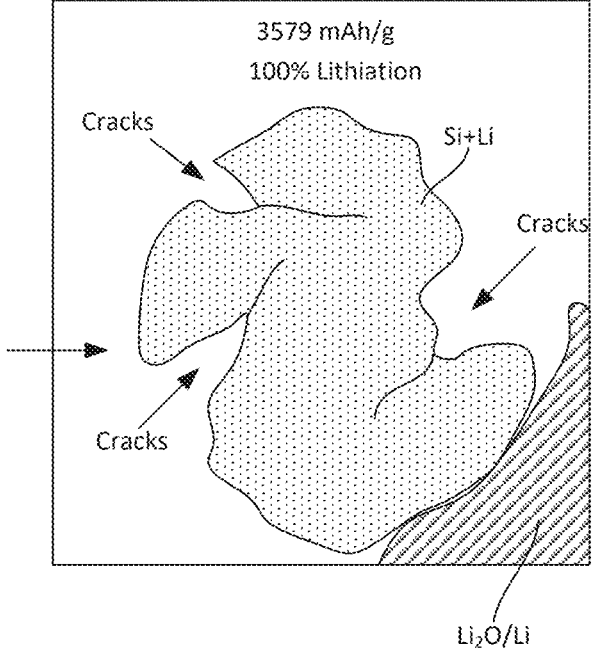

As noted above, high-capacity active materials tend to experience significant volume changes during lithiation (increase in volume/swelling) and delithiation (decrease in volume). At large scales and if not controlled, these volume changes can pulverize active-material structures and disrupt electronic pathways within the electrode layers. For example, FIGS. 1A and 1B are schematic reproductions of the TEM images illustrating a 1.8-micron silicon structure disintegrated due to the lithiation to a full (100%) lithiation capacity, which is about 3579 mAh/g at room temperature. During such lithiation, the silicon structure experiences a volume increase in the volume of about 3.81 times. However, this volume increase is not uniform and causes various internal stresses, which cause the structure to crack and, more generally, to pulverize. These cracks break electronic and ionic connections within the structure and expose additional surfaces for SEI formation, all of which are highly undesirable and result in lithiation/delithiation capacity losses of this structure.

It has been found that introducing various inert elements into silicon structures or, more specifically, atomically dispersing inert elements into silicon structures helps to reduce silicon swelling and also mitigates various aspects of such swelling. Without being restricted to any particular theory, it is believed that inert elements act (1) as buffers for swelling providing additional spacing, and (a) as binding agents surrounding and supporting silicon while silicon is being lithiated (i.e., forms an alloy). Inert elements may also form stronger bonds with the silicon atoms than, e.g., the Si—Si bond or Si—Li bond (in pure silicon particles that may be lithiated). In other words, the bond energy of the inert element to silicon can be higher than the bond energy of Si—Si and Si—Li. For example, silicon (Si) bonding energy with lithium (Li) is 188 kJ/mol, another atom of silicon (Si)—327 kJ/mol, bromine (Br)—343 kJ/mol, carbon (C)—435 kJ/mol, chlorine (Cl)—456 kJ/mol, fluorine (F)—540 kJ/mol, hydrogen (H)—298 kJ/mol, nitrogen (N)—439 kJ/mol, oxygen (O)—798 kJ/mol, and so on.

With that, the inert element —Si bonds will not be broken during the lithiation process, effectively "deactivating" some of the silicon in electrochemically active-material structures. As such, the ability of silicon to lithiate is diminished. This bond-strength feature provides the structural integrity of silicon or, more generally, of the high-capacity active materials during lithiation and delithiation.

Additionally, inert elements may also have no or low alloying volume-expansion effects when lithium is introduced into electrochemically active-material structures during cell charging. Specifically, inert elements can form alloys with lithium with low-volume expansion during lithiation. Inert elements can be inert to lithiation or have much lower lithiation capacity than silicon. The addition of one or more inert elements to silicon reduces the capacity of resulting structures (e.g., in comparison to pure silicon) thereby reducing the volume expansion aspects and preserving the mechanical integrity and performance of these resulting structures (effectively extending the cycle life of these structures and cells formed from these structures).

In some examples, inert elements form ionic bonds with lithium rather than forming metallic alloys. These ionic-bonding aspects also reduce the volume expansion of the electrochemically active-material structures during the lithiation.

The swelling reduction effect can be characterized by measuring the thickness change of the electrochemically active material structures or the negative active material layer during the lithiation process. The ratio of electrode thickness change at a certain level of lithiation, namely "swelling ratio", can be used to characterize the swelling reduction of the materials.

Figure 3:
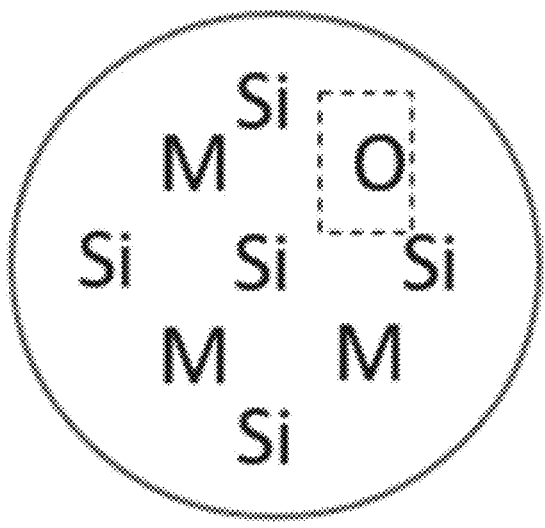
FIG. 3 is a schematic illustration of an electrochemically active-material structure, showing silicon, one or more inert elements, and optionally oxygen, being dispersed in the electrochemically active-material structure, in accordance with some examples.

For purposes of this disclosure, the term "atomically dispersed" or, more specifically, "chemically dispersed" is defined as a state in which individual atoms of one or more inert elements are evenly distributed within the electrochemically active-material structures and isolated from each other within the electrochemically active-material structures by silicon. In other words, there is no aggregation or clustering of the atoms of the inert element. Such dispersions should be distinguished from simple physical combinations of two or more types of structures (e.g., silicon structures and carbon structures) such as by physical mixing of two types of structures and/or depositing one type of structure on another (e.g., coating silicon structures with a carbon layer). The chemical/atomic dispersion can only be achieved by simultaneous synthesis of both types of structures (e.g., in a liquid solution). As such, electrochemically active-material structures with chemically/atomically dispersed silicon and inert elements can be also referred to as dual-material-co-deposited structures. The bonding/relationship between the inert element and silicon (or other high-capacity materials) can also be characterized as an alloy, a chemical compound, and/or a solid solution. Depending on the inert material, the resulting combination may be referred to as silicide, carbide, oxide, hydride, chloride, fluoride, bromide, nitride, and halide. In some examples, an inert element can be referred to as a dopant. Atomic dispersion is schematically illustrated in FIG. 3.

Similarly to "atomically dispersed", the exsistance of inert elements 140 in the electrochemically active material structure 120 can also be referred to as "chemically dispersed", which indicate the formation of chemical bonds between silicon 130 and inert elements 140 in the bulk phase through out the entire volume of the electrochemically active-material structures 120. This structure can be characterized as an alloy, a chemical compound, and/or a solid solution. But it is distingctly different from a physical mixture, core-shell structured coating, or a composite material with multiple components, which has no chemical interaction between different components or the chemical bonds only existing on the surface or at the interface between different materials.

The ratio of silicon atoms to inert element atoms in electrochemically active-material structures can be defined as R. In any 1 nm*1 nm*1 nm cubic space within the material structure, the R-value can be between 0.001 to 1000, 0.01 to 100, or 0.1 to 10. In other words, the atomic ratio of silicon to the inert element in any 1 nm*1 nm*1 nm cubic space of the entire volume of all electrochemically active-material structures is 0.001-1000, 0.01-100, or 0.1-10, which defines the atomic dispersion of the inert element in the electrochemically active-material structures.

If any region has R>1000, this region is considered to be a pure silicon region. If any region has R<0.001, this region is considered to be a pure inert material region. If both R>1000 and R<0.001, such regions can be found within the same material with phase segregation formed, in which case the inert material is not chemically/atomically dispersed. As such, the electrochemically active-material structures are completely free from any 1 nm*1 nm*1 nm cubic spaces that have the atomic ratio of silicon to the inert element greater than 1000 or less than 0.001.

In electrochemically active-material structures described herein and comprising both silicon and one or more inter elements, no such phase segregation is present. For example, the conventional physical mixing of silicon and carbon structures forms a distinct elemental boundary between the silicon structures and the carbon structures, i.e., one side of this boundary is silicon-rich, while the other side of this boundary is carbon-rich. It should be noted that separate silicon and carbon structures have a size of at least about 50 nanometers, which is much greater than 1 nm*1 nm*1 nm cubic spaces. Another conventional example is the coating of carbon on silicon materials or coating silicon materials on carbon structures (e.g., using carbonization of silicon structures, chemical vapor deposition of silicon layers on carbon structures, etc.). In all such coating examples, both silicon-rich regions and carbon-rich regions can be found.

In some examples, the R-value of the electrochemically active-material structures 120 at the particle level average can range from 1 to 19 (50 to 95 at % Si), 1 to 9 (50 to 90 at % Si), 1 to 4 (50 to 80 at % Si), 1 to 1.5 (50 to 60 at % Si), 0.1 to 1 (9 to 50 at %), and 1.5 to 4 (60 to 80 at % Si). If the R-value is too small, such as below 0.1 (10 at % Si), the capacity and first cycle Coulombic efficiency of the active-material structures 120 is low. For example, when R=1 (50 at % Si, e.g., SiO), the reversible capacity drops to 1500 mAh/g with the first cycle Coulombic efficiency is less than 80%. The capacity further drops when R<1. For example, if R=0.1, the maximum capacity this material can deliver will be less than 360 mAh/g, losing its advantage over graphite. If the R-value is too high, such as R>19 (95 at % Si), the electrochemically active-material structures behave like pure silicon (Si) without any stabilizing effects.

In some examples, the inert element (in electrochemically active-material structures) can contain lithium, making this lithium electrochemically inactive. In other words, no delithiation capacity (or less than the equivalent lithium content capacity) can be extracted, at least from these portions of the active material structure, up to 2.0V vs Li$^+$/Li. This lithium-inactivation is realized by fixing the lithium ions to the structural location of the silicon structure or by forming an ionic bond with other inert elements and/or silicon that are also present in the structure. Some examples include, but are not limited to, $Si(Li_xO_y)$, $Si(Li_xC_y)$, and $Si\ Li_xN_yCl_z)$. This lithium-inactivation approach is different from partially lithiated silicon particles, in which the lithium remains in the alloy form and is electrochemically active up to the full extraction, e.g., in $Li_{3.75}Si$, $Li_{3.5}Si$, $Li_{3.0}Si$, $Li_{2.0}Si$, or LiSi. As noted above, this lithium-inactivation approach involves atomic dispersion (e.g., using one or more precursors comprising silicon and one or more inert elements). The silicon-containing precursor can be different from the inert-element-containing precursor. Alternatively, the same precursor may contain both silicon and at least one inert element. It has also been found that forming pores in electrochemically active-material structures (comprising silicon and chemically dispersed inert elements) helps mitigate the volume expansion of these structures upon lithiation. Various types of pores are within the scope, e.g., open pores, closed pores, through pores, and atomic vacancies. Specifically, FIG. 6A is a schematic illustration of an electrochemically active-material structure 120 showing open pores 604, closed pores 606, through pores 602, and surface roughness 608. Open pores are pores that are connected to the external environment, which can be probed by gas adsoption or liquid infiltration analysis to obtain their pore size, total pore volume, and pore size/volume distribution. The closed pores are not accessible even by gas infiltration. The total closed pore volume can be estimated from the skeletal density probed by a gas pycnometer. The closed pore size/distribution information can also be obtained via X-ray Computed Tomography (such as micro-CT). Atomic vacancies are featured by deviation of the true density vs. theoretical density, as a result of missing atoms at certain locations, which are usually small in scale. All these pore structures together provide a multi-scale buffer space to reduce or accommodate the volume expansion of the material upon lithiation and improve stability.

Examples of Electrochemical Cells and Negative Electrodes

Figure 2A:
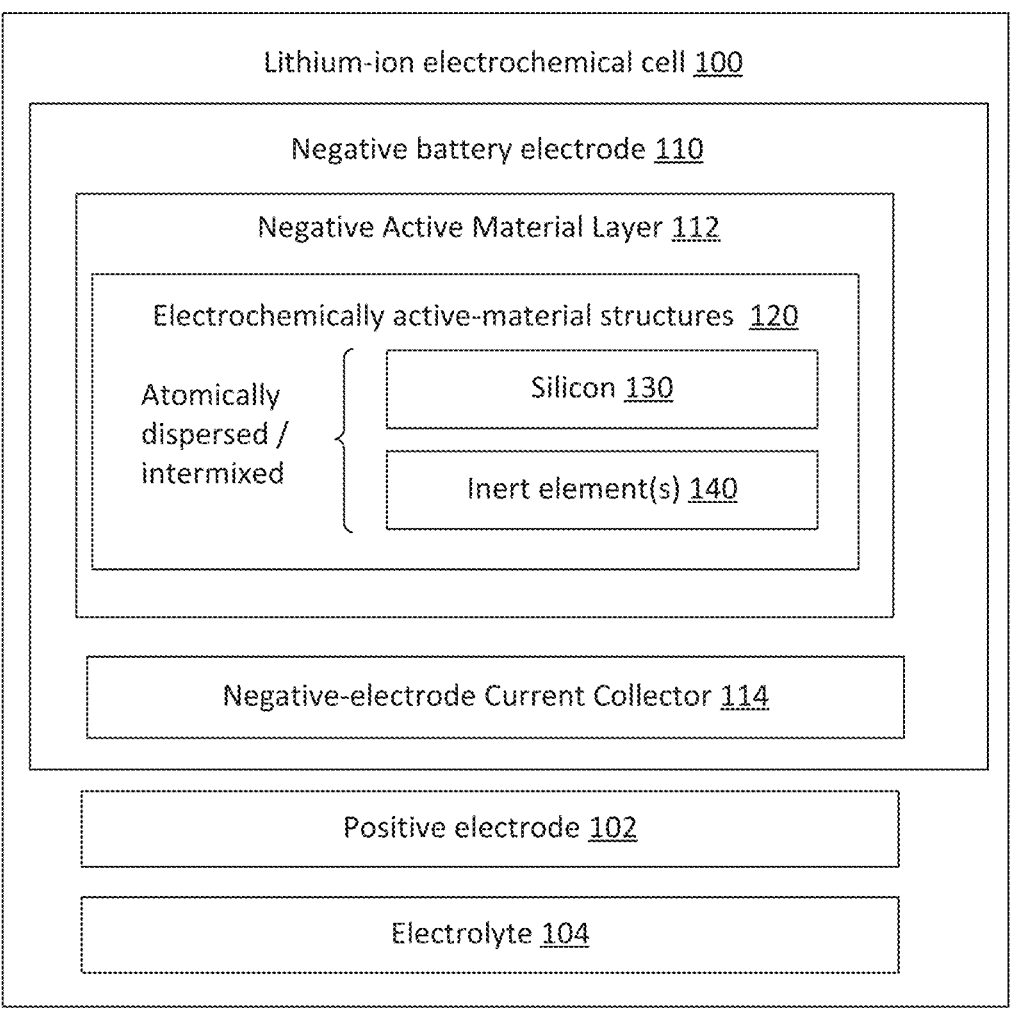
FIG. 2A is a block diagram illustrating various components of a lithium-ion electrochemical cell comprising electrochemically active-material structures with silicon and one or more inert elements, dispersed in the electrochemically active-material structures, in accordance with some examples.

FIG. 2A is a block diagram of a lithium-ion electrochemical cell 100 illustrating various components of the lithium-ion electrochemical cell 100, in accordance with some examples. Specifically, the lithium-ion electrochemical cell 100 comprises a negative battery electrode 110, a positive electrode 102, and an electrolyte 104. Other components (not shown in FIG. 2A) may include a separator, case, electrode/cell tabs, and the like. The negative battery electrode 110 and positive electrode 102 (together with the separator) may be arranged in a stack, wound jelly roll, or any form. Specifically, the separator may be disposed between the negative battery electrode 110 and positive electrode 102 to prevent direct contact between the electrodes yet allow ionic communication between these electrodes. Specifically, the separator may include pores, which are soaked with the electrolyte 104 that allows ions to pass between the electrodes. In other words, the electrolyte 104 operates as a carrier of ions during the cycling of the lithium-ion electrochemical cell 100. Some examples of separator material include poly(ethylene-co-tetrafluoroethylene (PETFE), poly(ethylenechloro-co-trifluoroethylene), polystyrenes, polyvinyl chlorides polypropylene, polyethylene, polyamides, polyimides, polyacrylics, polyacetals, polycarbonates, polyesters, polyetherimides, polyimides, polyketones, polyphenylene ethers, polyphenylene sulfides, glass fiber materials, ceramics, and a polypropylene membrane.

The electrolyte 104 may be liquid, solid, or gel. A liquid electrolyte may include one or more solvents and one or more lithium-containing salts. Some solvent examples include cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxy-ethane), nitriles (e.g., acetonitrile and adiponitrile) linear esters (e.g., methyl propionate, methyl pivalate, butyl pivalate, and octyl pivalate), and amides (e.g., dimethyl formamide). Some examples of salts include $LiPF_6$, $LiBF_4$, $LiClO_4$, $LiASF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li)$, and combination of thereof. The total concentration of one or more salts in the electrolyte is at least about 0.3 M or, more specifically, at least about 0.7M.

Figure 2B:
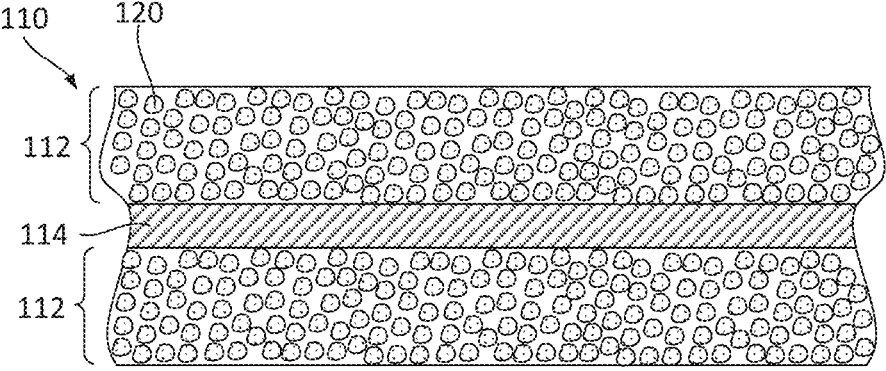
FIG. 2B is a schematic cross-sectional view of a negative electrode, illustrating electrochemically active-material structures (with silicon and one or more inert elements, dispersed in the electrochemically active-material structures) arranged into negative active material layers supported on the current collector, in accordance with some examples.

FIG. 2B is a schematic illustration of a negative battery electrode 110, in accordance with some examples. The negative battery electrode 110 comprises a negative-electrode negative-electrode current collector 114 and one or two negative active material layers 112, supported by the negative-electrode current collector 114. The negative-electrode current collector 114 provides electric communication between the negative active material layers 112 and other components of a lithium-ion electrochemical cell 100 (e.g., cell tabs). While FIG. 2B illustrates two negative active material layers 112, one having ordinary skill in the art would understand that an example with one negative active material layer 112 is also within the scope. This example may be referred to as a one-sided negative battery electrode. Various examples of the negative-electrode current collector 114 are within the scope, such as copper and/or copper dendrite-coated metal oxides, stainless steel, titanium, aluminum, nickel, chromium, tungsten, metal nitrides, metal carbides, carbon, carbon fiber, graphite, graphene, carbon mesh, conductive polymers, or combinations of above including multi-layer and/or composite structures. The negative-electrode current collector 114 may be formed as a foil, films, mesh, metallic foam laminate, wires, tubes, particles, multi-layer structure, or any other suitable configurations. In one example, the negative-electrode current collector 114 is a stainless steel foil having a thickness of between about 1 micrometer and 50 micrometers. In other examples, the negative-electrode current collector 114 is a copper foil with a thickness of between about 5 micrometers and 30 micrometers. In yet another example, current collector 114 is an aluminum foil with a thickness of between about 5 micrometers and 50 micrometers. It should be noted that the material of the negative-electrode current collector 114 used in the negative battery electrode 110 should be stable for potential ranges experienced by the negative battery electrode 110.

The positive electrode 102 may include a positive active material arranged into one or more positive active material layers. Some examples of positive active materials include $Li(M'_xM''_y)O_2$, where M' and M'' are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g., $Li(Co_xNi_{1-x})O_2$ and $Li(Co_xFe_{1-x})O_2$), $Li_{1-w}(Mn_xNi_yCo_z)O_2$, (e.g., $Li(Co_xMn_yNi_{(1-x-y)})O_2$, $Li(Mn_{1/3}Ni_{1/3}Co_{1/3}O_2$, $Li(Mn_{1/3}Ni_{1/3}Co_{1/3-x}MgX)O2$, $Li(Mn_{0.4}Ni_{0.4}Co_{0.2})O_2$, $Li(Mn_{0.1}Ni_{0.1}Co_{0.8})O_2$,) $Li_{1-w}(Mn_xNi_xCo_{1-2x})O_2$, $Li_{1-w}(Mn_xNi_yCoAl_w)O_2$, $Li_{1-w}(Ni_xCo_yAl_z)O_2$ (e.g., $Li(Ni_{0.8}Co_{0.15}Al_{0.05})O_2$), $Li_{1-w}(Ni_xCo_yM_z)O_2$, where M is a metal, $Li_{1-w}(Ni_xMn_yM_z)O_2$, where M is a metal, $Li(Ni_{x-y}Mn_yCr_{2-x})O_4$, $LiM'M''_2O_4$, where M' and M'' are different metals (e.g., $LiMn_{2-y-z}Ni_yO_4$, $LiMn_{2-y-z}Ni_yLi_zO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3)Li_xV_yO_z$, e.g., $LiV_3O_8$, $LiV_2O_5$, and $LiV_6O_{13}$.

Examples of Active-Material Structures With Atomically-Dispersed Inert Elements Referring to FIG. 2A, electrochemically active-material structures 120 comprise silicon 130 and one or more inert elements 140, chemically and/or atomically dispersed in the electrochemically active-material structures 120. Various aspects of atomic dispersion are described and defined above and also shown in FIG. 3. The inert element 140 comprises one or more elements selected from the group of hydrogen (H), lithium (Li), boron (B), carbon (C), nitrogen (N), fluorine (F), sodium (Na), magnesium (Mg), aluminum (Al), phosphorous (P), sulfur (S), chlorine (Cl), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), bromine (Br), strontium (Sr), zirconium (Zr), niobium (Nb), molybdenum (Mo), indium (In), lanthanum (La), cerium (Ce), tantalum (Ta), tungsten (W), and bismuth (Bi). For purposes of this disclosure, the term "inert element 140" is defined as an element not interacting with lithium at an operating voltage of the negative battery electrode 110 such that the inert element 140 does not contribute to the overall capacity of the electrochemically active-material structures 120. In other words, the lithiation capacity of the electrochemically active-material structures 120 is provided entirely by the content of silicon 130 in the electrochemically active-material structures 120.

In some examples, a specific subset of inert element examples includes hydrogen (H), boron (B), carbon (C), nitrogen (N), fluorine (F), magnesium (Mg), aluminum (Al), chlorine (Cl), titanium (Ti), chromium (Cr), iron (Fe), gallium (Ga), and bromine (Br). These specific materials have fewer viable oxidation states in the operating voltage window of the negative battery electrode 110 (than other examples not included in this list), which enhances their stability and reduces the capacity losses in the battery. Furthermore, this subset can be narrowed to hydrogen (H), boron (B), carbon (C), nitrogen (N), fluorine (F), magnesium (Mg), aluminum (Al), chlorine (Cl), iron (Fe), and bromine (Br), which are lighter elements thereby ensuring higher gravimetric capacity. Even a more specific subset includes hydrogen (H), carbon (C), nitrogen (N), fluorine (F), aluminum (Al), chlorine (Cl), iron (Fe), and bromine (Br). These materials are less basic when contacting water thereby allowing to use of these materials in water-base slurries.

In some examples, the inert element 140 comprises one or more elements selected from the group of hydrogen (H), carbon (C), nitrogen (N), and chlorine (Cl). Specifically, hydrogen (H) is the lightest element, which allows achieving the inter-function without introducing too much energy density and/or capacity loss. Hydrogen (H) can be co-synthesized with silicon (Si) using the following precursors: inorganic acid, organic acid, ammonium salts, silane, chrolosilane, or organosilane, e.g. sulfuric acid ($H_2SO_4$), nitric acid ($HNO_3$), acetic acid ($CH_3COOH$), citric acid ($HOC(CO_2H)(CH_2CO_2H)_2$), hydrochloric acid (HCl), hydrobromic acid (HBr), ammonium floride ($NH_4F$), ammonium chloride ($NH_4Cl$), monosilane ($SiH_4$), dililane ($Si_2H_6$), tricholosilane ($HSiCl_3$), dichlorosilane ($H_2SiCl_2$), dimethylsilane ($H_2Si(CH_3)_2$), phenylsilane ($C_6H_5SiH_3$). One example of incorporating hydrogen (H) into silicon structures includes proton reduction to zero-valent hydrogen and dissolving in the newly formed silicon, e.g., (a) $H^+ + e^- => H^0$ and (b) $xH^0 + Si => Si(H)_x$. Another example involves incomplete dissociation of H—Si bonds, e.g., $C_6H_5SiH_3 => C_6H_6 + Si(H)_x + (2-x)/2H_2$. In some examples, the concentration of hydrogen (H) in the electrochemically active-material structures 120 is 0-75 atom % such as 10 ppm—50 atom %, 10 ppm—25 atm %, 10 ppm—20%, 10 ppm—10%, 10 ppm—5%, 10 ppm—2%, 10 ppm—1%, 10 ppm-1000 ppm, and 10 ppm-100 ppm. If the atomic concentration of H is too high, the silicon structure will not be stable in the ambient air or water. If the atomic concentration of the H is too low, the stabilization effect will not be effective.

Carbon (C) is a light element and can be conductive. It should be noted that silicon is not bound to carbon in the non-conductive form (i.e., does not form crystalline silicon carbide). Furthermore, the atomic dispersion is different from silicon and carbon mixtures (e.g., when silicon and carbon are parts of different structures combined together as silicon particles and carbon particles). Various examples of carbon (C) being co-synthesized with silicon (Si) are described below. In some examples, the concentration (atomic percentage) of carbon (C) in the electrochemically active-material structures 120 is 0-75%, 0.01-50%, 0.01-25%, 0.01-20%, 0.01-10%, 0.01-5%, 0.01-2%, 0.01-1%, 0.1-30%, 1-30%, 5-30%, 5-20%, or 5-15%.

Similar to hydrogen (H), nitrogen (N) is a light element, which increases the hardness of silicon thereby mitigating the mechanical stresses induced on silicon during its lithiation. Nitrogen (N) can be co-synthesized with silicon (Si) using the following precursors and reactions: hexamethyldisilazane ($C_6H_{19}NSi_2$) and 2,2,4,4,6,6-hexamethylcyclotrisilazane. In some examples, the concentration (atomic percentage) of nitrogen (N) in the electrochemically active-material structures 120 is 0-75%, 0.01-50%, 0.01-25%, 0.01-20%, 0.01-10%, 0.01-5%, 0.01-2%, 0.01-1%, 0.1-30%, 1-30%, 5-30%, 5-20%, or 5-15%.

Chlorine (Cl) is a negatively charged anion that stabilizes the overall structure of the electrochemically active-material structures 120. Chlorine (Cl) can be co-synthesized with silicon (Si) using the following precursors and reactions: silicon tetrachloride ($SiCl_4$), Hexachlorodisilane ($Si_2Cl_6$), trichlorosilane ($HSiCl_3$), dicholorosilane ($H_2SiCl_2$), dimethyldichlorosilane ($CH_3)_2SiCl_2$, methyltrichlorosilane ($CH_3)SiCl_3$, chlorine ($Cl_2$), acyl chlorides, metal chlorides, quaternary ammonium compounds. In some examples, the concentration of chlorine (Cl) in the electrochemically active-material structures 120 is 0-75%, 0.01-50%, 0.01-25%, 0.01-20%, 0.01-10%, 0.01-5%, 0.01-2%, 0.01-1%, 0.1-30%, 0.1-10%, 1-10%, 2-10%, 2-5%, or 1-5%.

In general, the inert element 140 may have a concentration of 30-50% atomic in the electrochemically active-material structures 120, in which case, the electrochemically active-material structures 120 may be referred to as a high inert material content. At such high concentration levels of the inert element 140, the electrochemically active-material structures 120 can be highly stable but have reduced gravimetric lithiation capacity. In other examples, the inert element 140 may have a concentration of 5-30% atomic in the electrochemically active-material structures 120, which may be referred to as a moderate inert material content with a balanced performance. In further examples, In general, the inert element 140 may have a concentration of 0.1-5% atomic in the electrochemically active-material structures 120, which may be referred to as low inert material content-such structures retain their higher capacity at the expense of the mechanical stabilization.

In some examples, the electrochemically active-material structures 120 further comprise oxygen (in addition to the inert element 140). The oxygen atoms form one of the strongest bonds with silicon (bond energy of Si—O=798 kJ/mol) than Si—Si (bond energy of Si—Si=327 kJ/mol) or Si—Li (estimated to be 188 kJ/mol). Therefore, a very strong stabilizing effect can be achieved during lithiation. The concentration (atomic percentage) of oxygen in the electrochemically active-material structures 120 may be 5-30%, 0.1-5%.

In some examples, the inert element 140 and the silicon 130 form one or more of a homogenous mixture, a solid solution, and an alloy in the electrochemically active-material structures 120.

In some examples, only one single phase exists in the electrochemically active-material structures 120 or, more specifically, in the entire volume of the electrochemically active-material structures 120. It should be noted that other structures that do not have the same phase as electrochemically active-material structures 120 may be attached to or present together with the electrochemically active-material structures 120 in an electrode. However, these other structures are not parts of electrochemically active-material structures 120. For example, a carbon layer that coats the external surface of the electrochemical active-material structures 120 is not part of the electrochemical active-material structures 120. Another example is a set of graphite particles physically mixed with the electrochemical active-material structures 120 are not parts of the electrochemical active-material structures 120. It should be noted that electrochemically active-material structures 120 can be combined without various other structures (that are different than electrochemically active-material structures 120) while forming negative active material layers 112.

This single phase is defined by the absence of chemically or crystallographically distinguishable inhomogeneity. No such inhomogeneities can present inside one particle of the electrochemically active-material structures 120, or between the particles.

The ratio between silicon atoms and inert element atoms can be defined as R. For the material to be considered chemically indistinguishable, the R values of any 1 nm by 1 nm by 1 nm cubic space within the material structure cannot fluctuate more than 100%, 50%, 20%, 10%, 5%, 1%, or 0.1% of the average R values of the whole particle. This may be referred to as a compositional uniformity within each electrochemically active-material structure. This intra-particle compositional uniformity ensures the atomic dispersion and the single-phase throughout each particle.

Furthermore, the R values of any single particle can't be more or less than 100%, 50%, 20%, 10%, 5%, 1%, or 0.1% of the average R values of all the particles of the electrochemically active-material structures 120. This may be referred to as a compositional uniformity among different electrochemically active-material structures. This inter-particle compositional uniformity ensures the same atomic arrangement and lithiation behavior in different particles. For example, $SiC_{0.5}O_{0.5}Cl_{0.1}$, $SiC_{0.45}O_{0.45}Cl_{0.09}$, and $SiC_{0.55}O_{0.55}Cl_{0.11}$ are considered compositionally equivalent since the R-value deviations are less than 10% in this example. But Si, $SiO_{0.5}$, SiO, $SiO_2$, and C are considered compositionally different since the R-value deviations are about 100% in this example.

Figure 5A:
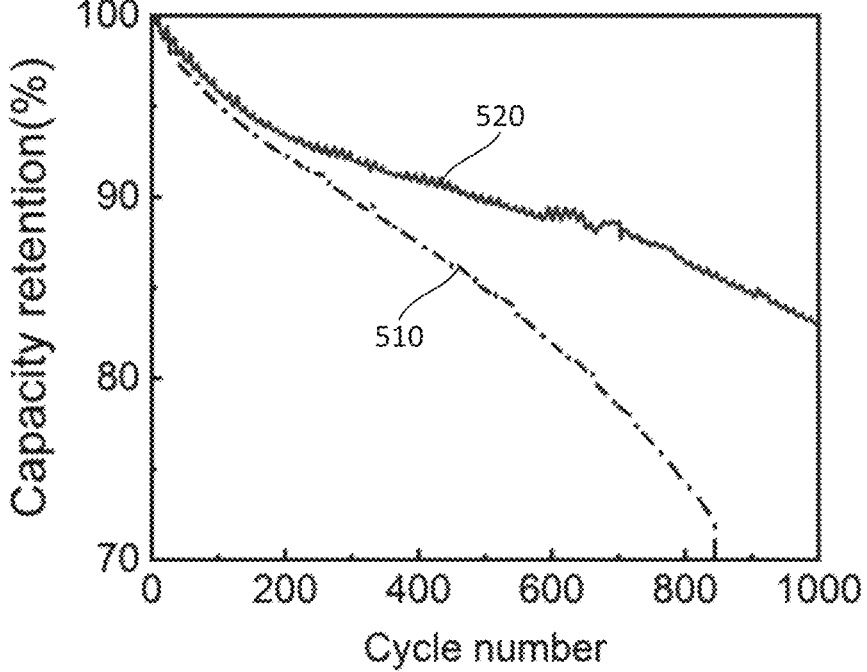
FIG. 5A illustrates cycle-life profiles for two types of electrochemical cells, i.e., cells fabricated with (1) pure silicon physically mixed with carbon materials and further coated by carbon coating on the surface and cells fabricated with (2) particles containing dispersed silicon, carbon, and oxygen, which has atomically mixed silicon (Si), carbon (C), and oxygen (O) inside the material.
Figure 5B:
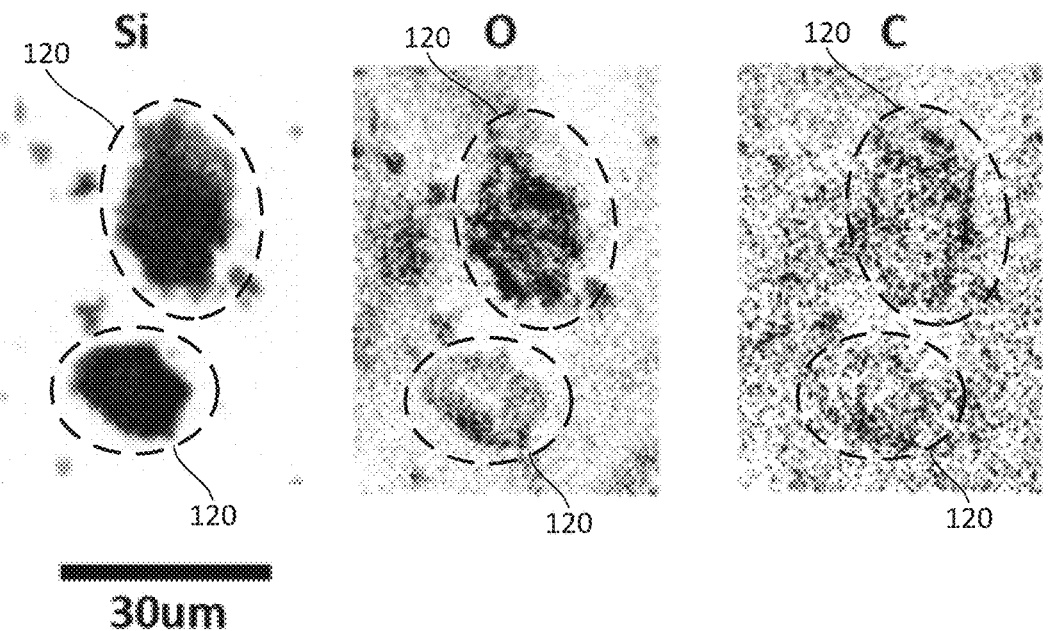
FIGS. 5B and 5C illustrate the difference in energy-dispersive spectroscopy (EDS) mapping analysis of particles containing dispersed silicon, carbon, and oxygen n (FIG. 5B) and physical mixture of silicon particles and carbon particles (FIG. 5C).
Figure 5C:
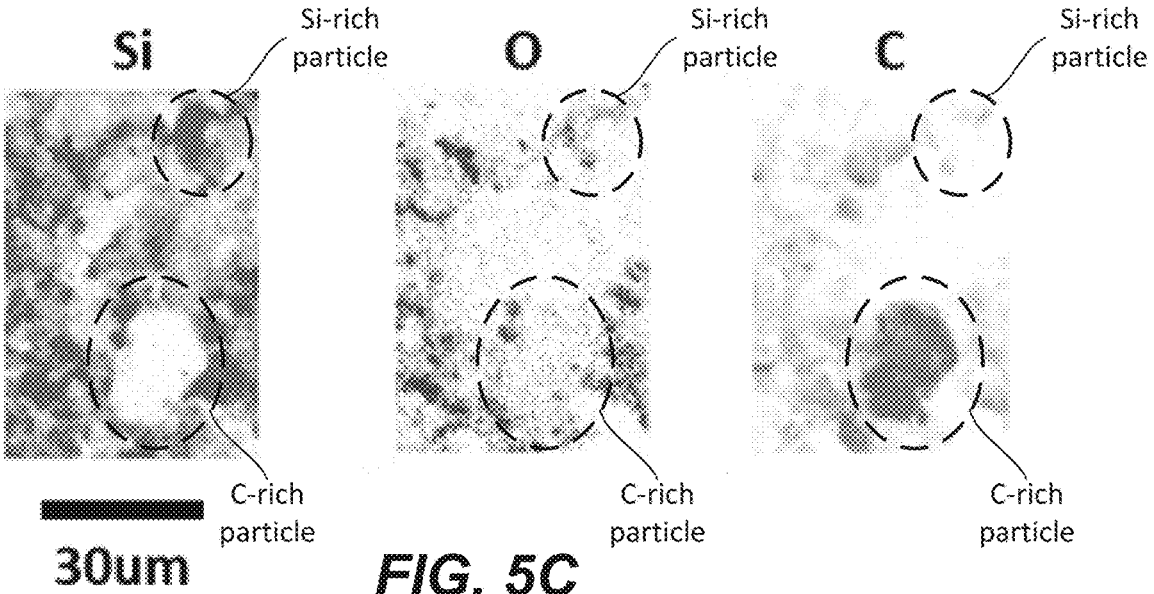

As an example, FIGS. 5B and 5C illustrate the difference in energy-dispersive spectroscopy (EDS) mapping analysis of individual silicon (Si), oxygen (O), and carbon (C) elements chemically and/or atomically dispersed inert in the same structure forming a single phase (FIG. 5B) and physical mixture of silicon particles with carbon particles, each type of particles representing a separate phase (FIG. 5C). Additional analysis of this EDS mapping is described below.

A single phase means the atomic arrangement is the same within one particle or between particles. For example, an amorphous glassy material with a fully random atomic arrangement and homogenous composition is considered a single phase, characterized by broad diffraction peaks. For example, silicon monoxide (SiO) is one type of amorphous material with chemically and/or atomically dispersed oxygen in silicon.

Polycrystalline materials with a single type of crystal structures and lattice parameters are considered one phase, characterized by only 1 set of diffraction peaks in X-ray diffraction. For example, nickel silicide ($NiSi_2$) is one type of crystalline material with chemically and/or atomically dispersed nickel in silicon. For comparison, c-Si and c-SiC are considered two different phases, due to the difference in the type of atoms. A combination of amorphous silicon and crystalline silicon is also considered a two-phase material, due to the different arrangement of atoms. For example, FIG. 6B is a schematic illustration of the atomic structure of pure silicon in a crystalline form, as a comparison to an electrochemically active-material structure 120 in FIG. 6C. Specifically, the electrochemically active-material structure 120 may have silicon clusters 610 as well as first-type inert atoms 612, second-type inert ations 614, and voids 616. There are not distinct boundaries between these components of the electrochemically active-material structure 120.

As such, a single-phase material should be distinguished from a mixture of different phases, e.g., a combination of amorphous and crystalline phases, or a combination of two different crystalline phases (e.g., c-Si and c-SiC). These mixtures of different phases have two or more distinct and different phases instead of forming a chemically and crystallographically homogenous structure as the case with atomic dispersion. For example, a physical mixture of 25 at % of silicon (Si) particles, 25 at % of silicon oxide ($SiO_2$) particles, and 50 at % carbon (C) particles may be compositionally the same as single-phase SiCO structures but the mixture has 3 separate phases (each defined by a separate type of particles) instead of a one phase of the SiCO structures. To achieve the one phase of the SiCO structures, these structures are synthesized such that all elements of these structures are introduced at the same time as further described below, which may be referred to as "chemical mixing" (or "chemical dispersion" to differentiate from "physical mixing" (or "mechanical mixing"). Specifically, "chemically dispersed" reflects to the formation of new chemicals (from the precursors) and formation of new chemical bonds between the atoms of these new chemicals. Overall, "chemically dispersed" results in a new, chemically uniform material. Atomic dispersion here occurs through the creation of these new materials. Specifically, during various chemical and/or electrochemical reactions, different atoms from one or more precursors combine to form new materials, where the atoms are dispersed at the atomic level. These atoms are often bonded together within a crystalline, polycrystalline, or amorphous structure. Physical mixed status involves the combination of solid structures without chemical reactions, meaning no new compounds or bonds are formed in the bulk phase. Physical mixing in solids is often achieved through mechanical methods such as milling, dispersing, coating, or pressing, where the only physical contact particles or layers without any bulk chemical interaction.

It should be noted that the integration of other materials (e.g., carbon, $SiO_2$, metals, silicon alloys) as a separate phase (from silicon) does not have the same effect as providing a single-phase combination in each electrochemically active-material structure. With multiple phases (with silicon particles representing one phase that is separate from another phase/particle of another material), even when the silicon particles are in the nanometer range, there is no stabilization effect within the silicon particles. This is because the frameworks/stabilizing structures are in a separate phase and are outside of silicon particles. There are clear boundaries/separation between the two phases and these boundaries/separation isolate the phases and any stabilization effects that one phase can provide to another phase. Modulation of the intrinsic properties of the silicon particles can only be achieved by atomically mixing the inert elements with silicon, forming a single phase within the particle.

In some examples, the single-phase nature can be characterized by the selective area electron diffraction in transmission electron microscopy. When electrons are diffracting in different areas of the particles of the electrochemically active-material structures 120, only one set of amorphous rings should be observed when the electrochemically active-material structures 120 is one single amorphous phase. Alternatively, if the electrochemically active-material structures 120 have a polycrystalline type, only one set of diffraction patterns that belong to one defined lattice parameter should be found. If the material contains phase segregation or is a composite structure, two or more sets of amorphous ring or lattice parameters will be found.

In some examples, the electrochemically active-material structures 120 are fully amorphous. Crystalline materials require a more strict atomic arrangement. Therefore, the maximum concentration of inert element incorporation is limited (in crystalline materials). When presented in amorphous or glassy states, higher atomic percent of inter atoms can be tolerated. For example, based on the phase diagram, carbon only has a solubility of 100~200 ppm inside crystalline silicon even at 1500~1700° C. Once cooled down to room temperature, c-Si, and c-SiC inevitably form, leading to phase segregation. But in the electrochemically active-material structures 120, because of the amorphous structure and low processing temperature history such phase segregation and undesired c-SiC phase can be avoided. As such, silicon (Si) and carbon (C) remain chemically and/or atomically dispersed. The high achievable levels of inert elements' incorporation into silicon is one major advantage of the atomic dispersion/single-phase in the electrochemically active-material structures 120. In some examples, the atomic percent of the total inert elements in the electrochemically active-material structures 120 can be from 0-1%, 1-10%, 10-50%, 50-90%, 10-40%, 20-30%, or 30-50%. A higher concentration of inert elements (when coupled with the atomic dispersion/single-phase aspects) provides a better stabilization effect of silicon in the electrochemically active-material structures 120 (that is not achievable with physical mixtures of particles and other forms of multi-phase materials).

In some examples, the composition of the electrochemically active-material structures 120 is expressed as $SiC_aM_bO_cX_d$, where Si stands for silicon, C stands for carbon; M stands for any metal selected from the groups of magnesium (Mg), aluminum (AI), titanium (Ti), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), tantalum (Ta), lanthanum (La), sodium (Na), and potassium (K), or any dopant selected from the group of hydrogen (H), boron (B), nitrogen (N), phosphorus (P), sulfur (S), arsenic (As), and telluride (Te); O stands for oxygen; and X stand for halogens selected from the group of fluorine (F), chlorine (Cl), bromine (Br), and iodine (I). Some metals, such as germanium and tin are not particularly helpful, because they can form alloys with lithium, which presents a similar level of volume expansion effect. The atomic ratios (relative to silicon (Si) baseline of 1) of these additional elements can be defined by various values of a, b, c, and d as further described below.

In some examples, "a" (the atomic ratio of carbon (C) relative to silicon (Si) in $SiC_aM_bO_cX_d$) is between 0 to 10, 0 to 2, 0.01 to 2, 1 to 2, 0.01 to 0.5, 0.1 to 0.9, 0.2 to 0.8, 0.3 to 0.7, 0.4 to 0.6, 0.1 to 0.2, 0.1 to 0.3, 0.1 to 0.5, 0.2 to 0.4, 0.2 to 0.5, and 0.25 to 0.35. When "a" is too high, the capacity of the active-material structures 120 will be too low due to the unfavorable Si—C bond formation which is unbreakable for lithium insertion. When "a" is too low, the stabilizing effect will not be strong enough. The "a" value can be modulated by controlling the ratio and type of carbon-containing precursors during synthesis. A lower ratio and more volatile precursors will lead to lower "a" values. Various aspects of this stabilizing effect are described above, e.g., lowering the lithiation limit/maximum capacity of the electrochemically active-material structures by including non-silicon elements.

In some examples, "b" (the atomic ratio of one or more metals/dopants (M) relative to silicon (Si) in $SiC_aM_bO_cX_d$) is between 0 to 2, 0.01 to 2, 1 to 2, 0.01 to 0.1, 0.1 to 0.5, and 0.5 to 1. When "b" is too high, the capacity of the active-material structures 120 will be too low due to extra weight addition. When "b" is too low, the stabilizing effect will not be strong enough and the conductivity can be lower. The "b" value can be modulated by controlling the ratio and type of metal/dopant-containing precursors during synthesis. A lower ratio and more volatile precursors will lead to lower "b" values.

In some examples, "c" (the atomic ratio oxygen (O) relative to silicon (Si) in $SiC_aM_bO_cX_d$) is between 0 to 2, 1 to 2, 0.01 to 2, 0.01 to 0.5, 0.1 to 0.9, 0.2 to 0.8, 0.3 to 0.7, 0.4 to 0.6, 0.1 to 0.2, 0.1 to 0.3, 0.1 to 0.5, 0.2 to 0.4, 0.2 to 0.5, 0.25 to 0.35. When "c" is too high, the capacity of the active-material structures 120 will be too low due to the irreversible $Li_xSiO_y$ phase formation during lithiation. When "c" is too low, the stabilizing effect will not be strong enough. The "c" value can be modulated by controlling the ratio and type of oxygen-containing precursors during synthesis. A lower ratio and more volatile precursors will lead to lower "c" values. It can also be modulated by the gas atmosphere during synthesis, an inter or reducing atmosphere containing only nitrogen, argon, or hydrogen will result in lower c values. The oxidative atmosphere created by oxygen, water vapor, and carbon dioxide will result in higher "c" values.

In some examples, "d" (the atomic ratio of one or more halogens (X) relative to silicon (Si) in $SiC_aM_bO_cX_d$) can be from 0 to 2, 0.001 to 0.2, 0.01 to 0.1, 0.01 to 0.05, 0.05 to 0.2. When "d" is too high, the capacity of the active-material structures 120 will be too low due to excessive weight. The structure of active-material structures 120 may also be unstable toward the aqueous phase due to the leachable halogen atoms. When "d" is too low, the stabilizing effect will not be strong enough. The "d" value can be modulated by controlling the ratio and type of halogen-containing precursors during synthesis. A lower ratio and more volatile precursors will lead to lower "d" values. It can also be modulated by the gas atmosphere during synthesis, free proton or oxygen-containing vapor will result in lower d values. A halogenated atmosphere created by fluorine, chlorine, bromine or iodine will result in higher "c" values.

In some examples, the atomic ratios are represented by a combination of $0.01 \leq a \leq 2$, $0 \leq b \leq 0.2$, $0.01 \leq c \leq 2$, and $0 \leq d \leq 0.1$, $0.1 \leq a \leq 0.7$, or more specifically $0.05 \leq a \leq 1$, $0 \leq b \leq 0.2$, $0.05 \leq c \leq 1$, and $0 \leq d \leq 0.1$ or more specifically, $0.1 \leq a \leq 0.7$, $0 \leq b \leq 0.2$, $0.1 \leq c \leq 0.7$, and $0 \leq d \leq 0.1$ or, more specifically, by a combination of $0.2 \leq a \leq 0.4$, $0 \leq b \leq 0.1$, $0.2 \leq c \leq 0.4$, and $0 \leq d \leq 0.1$. This combination offers a good balance between the capacity and the stability. When $a < 0.1$ or $c < 0.1$, the active material structures 120 perform like pure silicon, with a capacity close to 3600 mAh/g and fast capacity degradation. When $a > 0.7$ insulating SiC phase is likely to form in the active-material structures 120, leading to lower capacity and lower conductivity. When $c > 0.7$, the active-material structures 120 may behave like SiO which possesses a low capacity of less than 1500 mAh/g and first cycle efficiency lower than 80%, which will limit its application as the anode in batteries.

In specific examples, the active material structures 120 (represented by the formula SiCaMbOcXd) have $0.01 \leq a \leq 10$ and $0.01 \leq c \leq 2$ or, more specifically, $0.01 \leq a \leq 0.5$ and $0.01 \leq c \leq 0.5$. In the same or other examples, the active material structures 120 (represented by the formula SiCaMbOcXd) have $0.01 \leq a \leq 2$, $0 \leq b \leq 0.2$, $0.01 \leq c \leq 2$, and $0.01 \leq d \leq 0.1$. In yet another example, the active material structures 120 (represented by the formula SiCaMbOcXd) have $d > 0$.

In some examples, the amount of silicon 130 in the electrochemically active-material structures 120 is 64-95% by weight. As a reference, silicon monoxide (SiO) has a Si weight percentage of 63.6%. Additional pre-lithiation, magnesium doping, or carbon coating may further lower the concentration of silicon 130 in the negative active material layer 112. However, these additional components may be present as separate phases and are not parts of the electrochemically active-material structures 120. As another reference, commercial silicon powders usually have a silicon weight percentage>98%.

In the same or other examples, the atomic percentage of silicon 130 in the electrochemically active material structure 120 is 1-99%, 9-95%, 9-50%, 50-95%, 30-70%, and 45-65%. Such levels ensure that the lithiation capacity of the active material structure 120 exceeds that of graphite and silicon monoxide while the mechanical instability/pulverization aspects of silicon are sufficiently mitigated.

In some examples, the atomic percentage of the silicon 130 in any portion (that is sized 1 nm by 1 nm by 1 nm) in the entire volume of active material structure 120 is higher than 9%, 30%, 45%, 65%, 70%, or 95%. This ubiquitous presence of silicon ensures there is no phase segregation of inert element 140 out of the silicon structure, such as pure carbon phase or pure metal phase, that will diminish the stabilization effect achieved by atomic level mixing.

In some examples, the atomic percentage of all the inert elements 140 in any portion (that is sized 1 nm by 1 nm by 1 nm) in the entire volume of active material structure 120 is less than 91%, 70%, 55%, 35%, 30%, or 5. More specifically, the one or more inert elements 140 (R) in any 1 nm by 1 nm by 1 nm portion of the entire volume has a concentration of less than 10% atomic, while the difference of an average atomic ratio of the one or more inert elements 140 (R) in any 1 nm by 1 nm by 1 nm portion of the entire volume is less than 100% relative to an average atomic ratio of the entire volume or, more specifically, less that 50%, or even less than 10%. In some examples, the one or more inert elements 140 (R) in any 1 nm by 1 nm by 1 nm portion of the entire volume has a concentration of 10-20% atomic, while the difference of an average atomic ratio of the one or more inert elements 140 (R) in any 1 nm by 1 nm by 1 nm portion of the entire volume is less than 50% relative to an average atomic ratio of the entire volume. In further examples, the one or more inert elements 140 (R) in any 1 nm by 1 nm by 1 nm portion of the entire volume has a concentration of 20-50% atomic, while the difference of an average atomic ratio of the one or more inert elements 140 (R) in any 1 nm by 1 nm by 1 nm portion of the entire volume is less than 25% relative to an average atomic ratio of the entire volume. This limitation of inert elements concentration ensures there is no phase segregation of the inert element 140 out of the silicon structure, such as pure carbon phase or pure metal phase, that will diminish the stabilization effect achieved by atomic level mixing.

While the above description focuses on silicon 130, other high-capacity materials are also within the scope. Some other examples of high-capacity materials include, but are not limited to, silicon oxide, tin, tin oxides, germanium, and silicide. For example, silicon has a theoretical lithiation capacity of 3,579 mA/g and swells to about 3.8 times its initial volume at this lithiation limit. Germanium has a theoretical lithiation capacity of 1600 mA/g and swells about 3.5 times. Tin has a theoretical lithiation capacity of 994 mA/g and swells about 2.6 times. As a reference, graphite has a theoretical lithiation capacity of 372 mA/g and is an example of a low-capacity material. As noted above, as a result of these large capacities, high-capacity materials tend to experience large volume changes.

Referring to FIG. 2B, electrochemically active-material structures 120 are predominantly disjoined structures. The disjoined structures are defined as any two structures in which the high-capacity material of one structure does not physically contact the high-capacity material of the other structure or at least minor contact prevents any direct lithium migration between the two structures. It should be noted that other components of these disjoined structures (e.g., SEI layers) can contact each other and even overlap. For example, a disjoint ratio of electrochemically active-material structures 120 is at least 70%, at least 80%, or even at least 90%. The "disjoint ratio" is defined as a ratio of the number of all disjoint structures to the number of all (disjoint and fused) structures in a negative battery electrode.

In some examples, electrochemically active-material structures 120 are uniformly distributed within negative battery electrode 110 or, more specifically, within negative active material layer 112. The uniform distribution is defined as the difference in the volume, occupied by the electrochemically active-material structures in two disjoined unit volumes being less than 20%, less than 10%, or even less than 5%. The uniform distribution helps to prevent lithium welding/joining of electrochemically active-material structures 120 during cycling of the lithium-ion electrochemical cell that this negative battery electrode 110 is a part of.

In some examples, the negative active material layer 112 has a specific porosity defined as a ratio of the volume of all void spaces in the negative active material to the volume of the electrochemically active-material structures (SP=$V_{VOIDS}/V_{EAMS}$). The specific porosity (SP) should be distinguished from conventional porosity, where the basis would be the total volume of negative active material layer 112. In some examples, the specific porosity (SP) of the negative active material layer is at least 200% or, more specifically at least 300% or even at least 500%. The specific porosity (SP) provides a direct reference as to how much space is available in the negative active material layer 112 for electrochemically active-material structures 120 to swell into. The sufficient amount of space prevents electrochemically active-material structures 120 from pushing on each other and potentially causing these particles to join together/fuse (and potentially exceeding the pulverization threshold).

In some examples, negative battery electrode 110 further comprises additional structures that are configured to experience substantially no volume change during the cycling of the lithium-ion electrochemical cell. More specifically, the relative positions of electrochemically active-material structures 120 and additional structures remain the same during the cycling of the lithium-ion electrochemical cell. Some examples of additional structures include, but are not limited to, conductive-additive structures, stabilizing structures, and binders. For example, conductive-additive structures can be formed from a material selected from the group consisting of graphite, acetylene black, metal silicides, metal oxides, and silicates. Some examples of binders include, but are not limited to, arboxymethyl cellulose (CMC), styrene-butadiene rubber (SBR), polyacrylic acid (PAA), polyimides (PI), and poly (3,4-ethylenedioxythiophene) polystyrene sulfonate (PEDOT:PSS). The concentration of polymer binder in the negative active material layer 112 may be less than 20% by weight or even less than 1% by weight. These additional structures should be distinguished from the inert elements 140, which are parts of the electrochemically active-material structures 120.

Examples of Porous Electrochemically Active-Material Structures With Atomically-Dispersed Inert Elements In some examples, the electrochemically active-material structures 120 comprise one or more of open pores, closed pores, and atomic vacancies. For example, the electrochemically active-material structures 120 comprise open pores with a pore diameter size of 0-2 nm, 2-50 nm, or 50-135 nm, as probable by nitrogen gas adsorption analysis. If the total open pore volume within these diameter ranges is too large, the enveloped density is too low (e.g., less than 1.5 g/cc or even less than 1.0 g/cc) and the surface area of the material will be too high (e.g., greater than 10 m²/g or even greater than 100 m²/g). An enveloped density is defined below. The high surface area will result in a lower first-cycle efficiency and lead to excessive electrolyte consumption during cycling. If the total open pore volume is too little in these pore diameter ranges or non-existent, there will be no space buffer for the volume change after the lithiation of electrochemically active-material structures 120, which will result in easier particle pulverization and failure. The total open pore volume with a diameter under 135 nm of electrochemically active-material structures 120 as measured by nitrogen adsorption can be 0.001-0.01 cm³/g, 0.01-0.1 cm³/g, 0.001-0.005 cm³/g, 0.01-0.05 cm³/g, 0.05-0.1 cm³/g, 0.1-0.5 cm³/g, 0.5-1 cm³/g, or 1-2 cm³/g. The open pores usually contribute the majority of the total void space within the enveloped volume of the material. As a result of the existence of the open pores, the enveloped density of the electrochemically active-material structures 120 will be reduced from the theoretical density of silicon (2.33 g/cm³) to be between 1.5-2.3 g/cm³, 2.2-2.3 g/cm³, 2.1-2.2 g/cm³, 2.0-2.1 g/cm³, 1.9-2.0 g/cm³, 1.8-1.9 g/cm³, 1.7-1.8 g/cm³, 1.6-1.7 g/cm³, 1.5-1.6 g/cm³, or 1.0-1.5 g/cm³.

Figure 7:
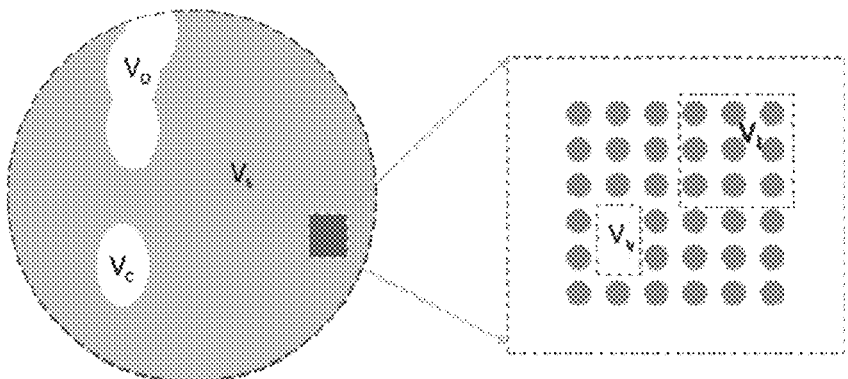
FIG. 7 is a schematic illustration of an electrochemically active-material structure identifying a portion of the structure to illustrate various identified characteristics.

In some examples, the closed pores of electrochemically active-material structures 120 can have pore diameter sizes 0-0.1 nm, 0-1 nm, 1-2 nm, 2-50 nm, or 50-135 nm. The closed pore reduces the skeletal density of the material, without a significant increase of the external surface accessible by gas or liquid electrolyte. The following equations define the true density, theoretical density, skeletal density, and enveloped density:

$$\text{Theoretical density} = \text{mass}/V_t$$

$$\text{True density} = \text{mass}/(V_t + V_v)$$

$$\text{Skeletal density} = \text{mass}/(V_t + V_v + V_c)$$

$$\text{Enveloped density} = \text{mass}/(V_t + V_v + V_c + V_o)$$

where
$V_t$ represents the ideal theoretical volume of a fully packed crystal structure of the material,
$V_v$ represents the volume of atomic vacancies,
$V_s = V_v + V_t$ is the volume used to calculate the true density, and
$V_c$ represents the closed pore volume, and
$V_o$ represents the open pore volume.
Some of the characteristics are schematically illustrated in FIG. 7 showing an electrochemically active-material structure and identifying various elements.

Ideally, pore structure can offer a volume buffer while not significantly reducing the first cycle Coulombic efficiency. However, if too many closed pores are in the active-material structures 120, the material mechanical strength may be compromised, leading to easier structural collapse under mechanical stress. The closed pore volume can dominate the density change from the theoretical density to skeletal density. Therefore, skeletal density probed by Helium gas or liquid mercury pycnometry can reflect the quantity of the closed pores of active-material structures 120. The skeletal density of the active-material structures 120 can be 1.5-2.3 g/cm³, 2.2-2.3 g/cm³, 2.1-2.2 g/cm³, 2.0-2.1 g/cm³, 1.9-2.0 g/cm³, 1.8-1.9 g/cm³, 1.7-1.8 g/cm³, 1.6-1.7 g/cm³, 1.5-1.6 g/cm³, or 1.0-1.5 g/cm³. Another way to describe is the relative ratio between skeletal density and theoretical density, which can be 0.99-0.1, 0.99-0.2, 0.99-0.5, 0.99-0.9, 0.9-0.8, 0.8-0.7, 0.7-0.6, 0.6-0.5, 0.9-0.5, 0.9-0.6, 0.9-0.7, or 0.9-0.8.

In some examples, atomic vacancies exist in the active-material structures 120. Atomic vacancies exist both in crystalline and amorphous materials. The quantity of atomic vacancies is significantly higher in amorphous materials than in polycrystalline materials and single-crystalline materials, due to the less strict bonding requirement. This results in the true density of the material to be lower. The existence of atomic vacancies will change the chemical environment of the atoms around the vacancies, therefore modifying both the chemical energy and mechanical behavior of the materials. True density can be probed by advanced imaging techniques with high spatial resolution, such as Transmission Electron Microscopy, by probing the averaged chemical coordination numbers via X-ray absorption near edge structure (XANES) or X-ray absorption fine structure (XAFS), or by Rietveld refinement of X-ray diffraction data. The atomic vacancies are usually not a significant source of volume buffer for their small contribution in lowering the density of the materials. However, they can still add extra space to accommodate Li atoms during lithiation at the atomic level. Also, the atomic vacancies can result in the disruption of the long-range ordering of the material, increasing the difficulty of the material to get crystalized, especially during the lithiation process. This will reduce the formation of the undesired c-$Li_{3.75}Si$ phase, increasing the stability of the material. The true density can be 2.3-2.33 $g/cm^3$, 2.2-2.3 $g/cm^3$, 2.1-2.2 $g/cm^3$, 2.0-2.1 $g/cm^3$, or 1.9-2.0 $g/cm^3$, 1.8-1.9 $g/cm^3$, 1.7-1.8 $g/cm^3$, 1.6-1.7 $g/cm^3$, 1.5-1.6 $g/cm^3$, or 1.0-1.5 $g/cm^3$. Another way to describe is the relative ratio between true density and theoretical density, which can be 0.999-0.9,0 0.999-0.95, 0.999-0.99, 0.999-0.995, 0.9-0.8, 0.8-0.7, 0.7-0.6, 0.6-0.5, 0.9-0.5,0.9-0.6, 0.9-0.7,or 0.9-0.8.

In some examples, the combination can be described by the following relative values. The ratio of true density/theoretical density, skeletal density/true density, enveloped density/skeletal density.

|  | true density/ theoretical density | skeletal density/ true density | enveloped density/ skeletal density |
|---|---|---|---|
| Example 1 | 0.99-0.999 | 0.9-0.99 | 0.8-0.99 |
| Example 2 | 0.95-0.99 | 0.8-0.9 | 0.6-0.8 |
| Example 3 | 0.90-0.95 | 0.7-0.8 | 0.4-0.6 |
| Example 4 | 0.90-0.99 | 0.6-0.7 | 0.2-0.4 |

In some examples, the combination of different pore volumes and skeletal densities results in different first-cycle efficiency and swelling ratios. An experiment was conducted using different active material structures 120 with the same chemical composition but different pore structures. These active material structures were mixed with graphite at the same weight ratio yielding a 500 mAh/g capacity composite. The first cycle Coulombic efficiency (FCE) and fully charge swelling ratio were characterized with the results presented in the table below. Samples A and B had low closed pore volume/high skeletal density. Samples C and D have high closed pore volume/low skeletal density. The difference between these two groups is the swelling ratio after fully charging. Specifically, samples C and D demonstrated significantly lower swelling due to more closed pore structures. The difference between samples A and B and, separately, between samples C and D was the total open pore volume. This difference provides the accessible surface area for electrolytes and impacts the first cycle Coulombic efficiency (FCE) as shown in the table below. Sample D is one example of preferred combinations with moderate closed pore structures (reflected by skeletal density) that can reduce swelling and moderate open pore volume that will not decrease the FCE too much.

| Sample ID | Skeletal density($g/cm^3$) | Open pore volume($cm^3/g$) | Enveloped density($g/cm^3$) | FCE | Swelling Ratio |
|---|---|---|---|---|---|
| A | 2.3 | 0.1 | 1.87 | 90% | 45% |
| B | 2.3 | 0.01 | 2.25 | 92% | 50% |
| C | 2 | 0.1 | 1.67 | 89% | 30% |
| D | 2 | 0.01 | 1.96 | 91% | 35% |
| E | 2 | 1 | 1.00 | 85% | 25% |

Examples of Active-Material Structures with Controlled Crystallinity and Domain Sizes In some examples, the active-material structures 120 consist entirely of an amorphous phase. The amorphous nature can be characterized by X-ray diffraction. The diffraction patterns of amorphous material feature broad peaks rather than sharp peaks in crystalline materials. In the example of amorphous silicon, two broad peaks at around 26 degrees and 50 degrees will be expected while the three most intensive peaks for crystalline silicon are sharp peaks at around 28.5degrees, 47.3 degrees, and 56.1 degrees. To be noted, either the amorphous or polycrystalline state of the active-material structures 120 is still preserving the silicon as the base crystal structure (e.g., amorphous or polycrystalline). This is distinguishable from silicon carbide (SiC), silicon suboxide such as silicon monoxide (SiO), or silicon dioxide ($SiO_2$), which can't be heat treated to get pure crystalline Silicon structure without other reducing agents. Another way to distinguish the amorphous materials is the crystallization temperature and heat. In some examples, the crystalline temperature may be 500-1000° C., 600-900° C., 700-800° C., 750-850° C., 500-600° C. The heat of crystallization can be measured by differential scanning calorimetry the value can be 11.9-10 kJ/mol, 10-9 kJ/mol, 9-8 kJ/mol, 8-7 kJ/mol, 7-6 kJ/mol, 6-5 kJ/mol, 5-4 kJ/mol, 4-3 kJ/mol, 3-2 kJ/mol, 2-1 kJ/mol, 1-0.1 kJ/mol. The heat of crystallization represents the percentage of amorphous content in the material. The high amorphous level is beneficial for material stability.

In some examples, the active-material structures 120 comprise polycrystalline materials with small domain sizes (e.g., less than 5 nm). The small domain size is beneficial to reduce the mechanical strain after volume expansion upon lithiation. The domain size can be characterized by X-ray diffraction and Scherrer's equation. The domain size of the crystalline portion of the active-material structures 120 can be 0-5 nm, 0.1-4 nm, 0.5-3 nm, 0.5-2 nm, 0.5-1 nm, 0.7-1.5 nm, 1-4 nm, 1-3 nm, 1-2nm, 2-4 nm, 2-3nm, and 0.2-1.5 nm.

In some examples, the silicon structure with the amorphous or polycrystalline nature of the active-material structures 120 can be characterized by Raman spectroscopy. Raman spectroscopy reflects the vibrational modes of the molecules which can provide structural fingerprints of materials. This can help to differentiate the active-material structures 120 from silicon monoxide or silicon carbide. In some examples, the active-material structures 120 with amorphous silicon structure will present a broad peak with Raman shift at around 460 $cm^{-1}$ (e.g., 450-470 $cm^{-1}$). In other examples, the active-material structures with polycrystalline structure will present a sharp peak with Raman shift at around 520 cm$^{-1}$ (e.g., 515-525 cm$^{-1}$). This is distinctly different from silicon monoxide (SiO) which presents three main peaks at 444 cm$^{-1}$, 454 cm$^{-1}$, and 502 cm$^{-1}$. This is also distinctly different from SiC which has three peaks at around 760 cm$^{-1}$, 790 cm$^{-1}$, and 960 cm$^{-1}$.

Examples of Active-Material Structures With Controlled Maximum Capacity

In some examples, the max lithiation capacity of active-material structures 120 is controlled by incorporating inert atoms and the crystal structure mentioned above. The lithiation capacity of pure silicon can be 4200 mAh/g, corresponding to Li$_{4.4}$Si. The maximum lithiation capacity of electrochemically active-material structures 120 is less than 3600 mAh/g, corresponding to Li$_{3.75}$Si, even when the electrochemical potential of the material is lithiated to 5 mV vs Li$^+$/Li. In more specific examples, the maximum delithiation capacity of the electrochemically active-material structures 120 is 1300 to 3800 mAh/g such as 3500-3800 mAh/g, 3300-3500 mAh/g, 3000-3300 mAh/g, 2800-3000 mAh/g, 2500-2800 mAh/g, 2000-2500 mAh/g, and 1500-2000 mAh/g when delithiated to 2.0V vs Li+/Li after a full lithiation to 5 mV vs Li+/Li. A lower lithiation reduces the volume expansion thereby preserving the mechanical stability of the electrochemically active-material structures 120. However, a low lithiation capacity reduces the energy density of the battery. The capacity ranges can be achieved by modulating the inter-atom concentration. The table below lists some examples of atomic ratios to achieve a certain capacity. The atomic ratio is normalized to the silicon atoms.

| Si | C | Fe | Al | Ti | Mg | O | Cl | F | Capacity (mAh/g) |
|---|---|---|---|---|---|---|---|---|---|
| 1 | | | | | | | | | 3600 |
| 1 | 1 | | | | | | | | 2520 |
| 1 | 1 | | | | 1 | | | | 842 |
| 1 | 1 | | | | 1 | | | 1 | 629 |
| 1 | 1 | | | | | 0.5 | | 1 | 1104 |
| 1 | 1 | | | | | 0.25 | | 1 | 1387 |
| 1 | 1 | | | | | 0.1 | | 1 | 1575 |
| 1 | 0.5 | | | | | 0.1 | | 1 | 1747 |
| 1 | 0.2 | | | | | 0.1 | | 1 | 1871 |
| 1 | 0.1 | | | | | 0.1 | | 1 | 1916 |
| 1 | 0.1 | | | | | 0.1 | | 0.1 | 2918 |
| 1 | 0.1 | | | | | 0.1 | 0.1 | | 2778 |
| 1 | 0.1 | | | | 0.1 | 0.1 | | | 2874 |
| 1 | 0.1 | | | 0.1 | | 0.1 | | | 2680 |
| 1 | 0.1 | | 0.1 | | | 0.1 | | | 2848 |
| 1 | 0.1 | 0.1 | | | | 0.1 | | | 2621 |
| 1 | 0.2 | | | | | 0.2 | 0.1 | | 2424 |
| 1 | 0.3 | | | | | 0.3 | 0.1 | | 2120 |
| 1 | 0.4 | | | | | 0.4 | 0.1 | | 1856 |
| 1 | 0.5 | | | | | 0.5 | 0.1 | | 1624 |
| 1 | 0.5 | | | | | 0.5 | 0.01 | | 1747 |
| 1 | 0.1 | 0.05 | | | | 0.1 | 0.01 | | 2810 |
| 1 | 0.1 | | 0.05 | | | 0.1 | 0.01 | | 2936 |
| 1 | 0.1 | | | 0.05 | | 0.1 | 0.01 | | 2844 |
| 1 | 0.1 | | | | 0.05 | 0.1 | 0.01 | | 2949 |
| 1 | 0.1 | | | | | 0.1 | 0.01 | | 3063 |
| 1 | 0.2 | | | | | 0.2 | 0.01 | | 2652 |

The following table provides examples of crystallinity vs. capacity. The crystallization degree is characterized by comparing the integrated crystalline Si diffraction peak intensity of XRD against a set of calibration samples with a known ratio mixture of amorphous and crystalline silicon. The silicon in this table is in the form of non-stabilized pure silicon particles without any inert elements in these structures.

| Material | Crystallization degree | Capacity(mAh/g) |
|---|---|---|
| c-Si | 100% | 3600 |
| | 50% | 3450 |
| | 10% | 3330 |
| a-Si | 0% | 3000 |

In some examples, the first cycle efficiency of the active-material structures 120 in the voltage window of 5 mV to 2.0V vs Li$^+$/Li can be 70%-80%, 80%-85%, 85%-90%, 90%-95%, 90%-93%, 91%-93%, or 92%-93%. A higher Coulombic efficiency is needed for the battery to cycle for a long time and deliver high capacity. The high Coulombic efficiency of the active-material structures 120 is achieved by the combination of chemically and/or atomically dispersed inert elements that will not bond with lithium to form irreversible products, controlled total open pore volume to minimize surface area, and controlled maximum lithiation capacity to prevent irreversible phase formation.

Figure 4:
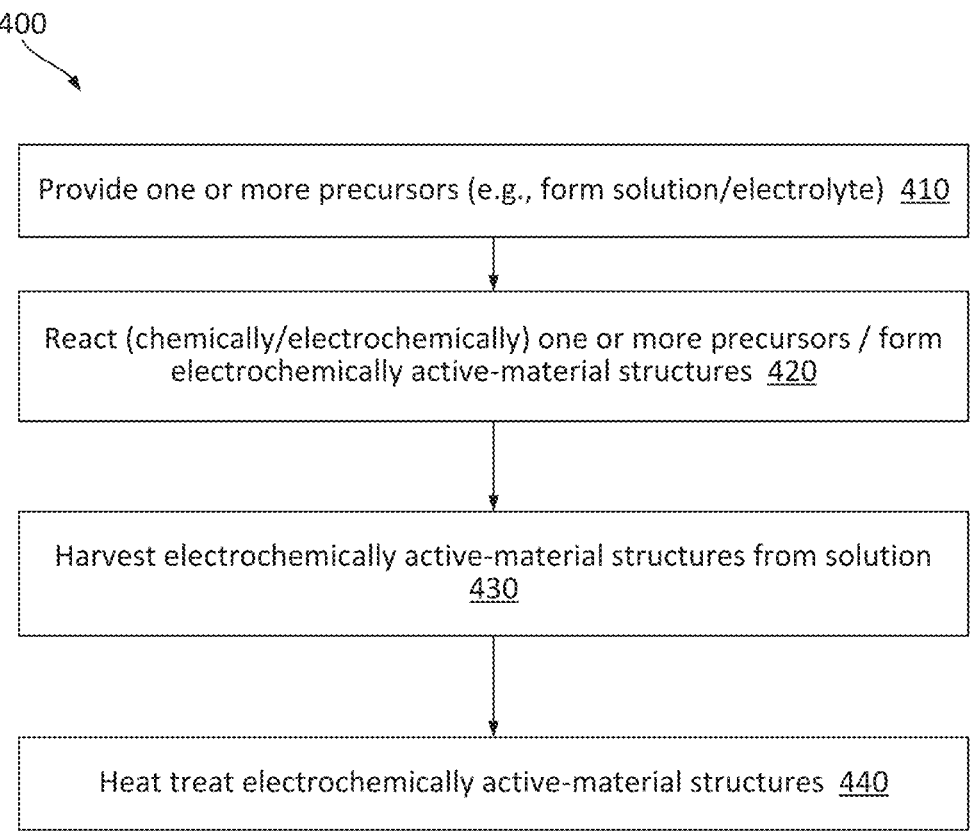
FIG. 4 is a process flowchart corresponding to a method of fabricating electrochemically active-material structures for negative battery electrodes in lithium-ion electrochemical cells, in accordance with some examples.

Examples of Methods of Fabricating Electrochemically Active-Material Structures FIG. 4 is a process flowchart corresponding to method 400 of fabricating electrochemically active-material structures 120 for a negative battery electrode 110 for use in a lithium-ion electrochemical cell 100, in accordance with some examples. Various examples of these electrochemically active-material structures 120 and negative battery electrodes 110 as well as lithium-ion electrochemical cells 100 are described above. Additional features will be now described in the context of this structure's fabrication method 400.

In some examples, method 400 commences with (block 410) providing one or more precursors comprising silicon 130 and one or more inert elements 140. These precursors are dissolved in a liquid solvent and form a homogenous liquid-phase mixture. More specifically, one or more precursors are atomically dispersed in one or more precursors (due to the dissolution of the precursors in the liquid solvent). This dissolution/atomic dispersion resulting in the homogenous nature of the liquid-phase mixture ensures that the silicon 130 and one or more inert elements 140 are chemically and/or atomically dispersed in the electrochemically active-material structures 120 when these electrochemically active-material structures 120 are formed.

In some examples, the homogenous liquid-phase mixture may be substantially free from solid species (e.g., solid particles) before reacting the one or more precursors (e.g., the solid-phase content may be less than 5% by weight, less than 1% by weight, or even less than 0.1% by weight). Particles or, more specifically, electrochemically active-material structures 120 are formed when one or more precursors react.

Method 400 may proceed with (block 420) reacting one or more precursors to form the electrochemically active-material structures 120 comprising the silicon 130 and the inert element 140, chemically and/or atomically dispersed in the electrochemically active-material structures 120. Specifically, one or more precursors can react chemically or electrochemically. In some examples, these reactions may be performed at a temperature less than 300° C. or even less than 100° C.

In other words, one or more precursors are reacted using reaction conditions that induce the formation of the electrochemically active-material structures 120 by simultaneously extracting the silicon 130 and the one or more inert elements 140 from the one or more precursors and incorporating the silicon 130 and the one or more inert elements 140 into the electrochemically active-material structures 120.

It should be noted that the electrochemically active-material structures 120 are solid structures forming a suspension in the liquid solvent. This suspension should be distinguished from the homogenous liquid-phase mixture that exists before the electrochemically active-material structures 120 are formed. In other words, the homogenous liquid-phase mixture is converted into a suspension as the electrochemically active-material structures 120 are formed from one or more precursors.

In some examples, the reaction conditions comprise introducing a reducing agent having a reducing potential more negative than any of the one or more precursors dissolved in the liquid solvent. For example, the reducing agent has a reducing potential more negative than −1V vs. a standard hydrogen electrode. Various examples of reducing agents are described below.

In some examples, the liquid solvent forming the homogenous liquid-phase mixture is selected from the group consisting of an organic solvent and an ionic liquid. For example, the liquid solvent is the organic solvent selected from the group consisting of an alkane, alkene, arene, ether, halogenated solvent, ester, amide, nitrile, and carbonate.

In some examples, method 400 further comprises (block 430) harvesting the electrochemically active-material structures 120 from the solution and (block 440) heat treating the electrochemically active-material structures 120. For example, the electrochemically active-material structures 120 can settle at the bottom of the reaction tank due to gravity and can be collected and washed (e.g., to remove residual precursors, and solvents) and dried.

In some examples, the heat treatment is performed at a temperature of 50-1100° C. (e.g., 200-400° C., 400-600° C., 600-800°° C., or 800-1100° C.) to crystalize the electrochemically active-material structures 120. For example, the crystallization degree can be defined by crystallization enthalpy (at around 800° C.), with the crystallinity degree being less than 90%, less than 50%, less than 20%, or even less than 5% in some examples.

Electrochemical Fabrication Examples

For example, the electrochemical fabrication may utilize two electrodes submerged into an electroplating bath that can be used for containing one or more precursors. A voltage of between 2.5V to 6V or, more specifically, between 3V and 5V can be applied between these electrodes to initiate the electrochemical reactions.

For example, an electrochemical reduction can be performed in an electrolyte solution comprising a solvent, a salt, and one or more precursors. In a specific example, 1 M of silicon tetrachloride ($SiCl_4$), 1M of carbon tetrachloride ($CCl_4$), and 1M of tetrabutylammonium chloride (($C_4H_9$)$_4$NCl) can be dissolved in diglyme to form the electrolyte solution. A voltage of 5V can be applied between the electrodes submerged in this solution. The product can be harvested as electrochemically active-material structures containing silicon and carbon.

$$xSiCl_4 + yCCl_4 \Rightarrow Si_x(C)_y + 2(x+y)Cl_2$$

The amount of carbon integrated into electrochemically active-material structures 120 is expected to be 1 to 30 atomic %.

The voltage applied here can far exceed the deposition voltage needed for these two precursors. Therefore, the reaction rate can exceed the speed of the formed product to be selectively deposited.

Chemical Fabrication Examples

In a chemical reduction example, one or more precursors are mixed with one or more reductive agents for reaction. In more specific examples, a solvent can be optionally added to the mixture to facilitate the reaction between one or more precursors and one or more reductive agents. Suitable reducing agents have a redox potential below −1V vs. the standard hydrogen electrode and may include lithium metal, sodium metal, magnesium metal, lithium biphenyl, sodium naphthalene, and the like. Examples of liquid solvents include alkanes, alkenes, arenes, ethers, halogenated solvents, esters, amides, nitriles, carbonates, ionic liquids, and the like It should be noted that the reaction takes place at a temperature not exceeding 300° C., not exceeding 200° C., or not exceeding 100° C., or even at not exceeding 50° C.

In a specific example, 1M of Li metal (used as a reductive agent) can be dissolved in 2M of lithium biphenyl solution in tetrahydrofuran (THF) (used as a solvent), forming a homogenous liquid mixture. 0.125M of trichloromethylsilane ($CH_3$—$SiCl_3$) (used as both a carbon-containing precursor and a silicon-containing precursor) and 0.125M of silicon tetrabromide ($SiBr_4$) (used as a silicon-containing precursor) can be added into the solution to induce the reduction of these two precursors. The reaction takes place at room temperature and can initiate immediately upon the addition of the two precursors. The ratio of carbon doping can be tuned by the ratio between the two precursors, i.e., trichloromethylsilane ($CH_3$—$SiCl_3$) and silicon tetrabromide ($SiBr_4$)). For example, the 0.125M of trichloromethyl silane ($CH_3$—$SiCl_3$) and 0.125M of silicon tetrabromide ($SiBr_4$) produce the final C:Si atomic ratio is 1:2. The corresponding chemical reaction is presented below:

$$7\,Li\!-\!metal + CH_3 - SiCl_3 +$$

$$SiBr_4 \Rightarrow Si_2(CH_3)_x + 3LiCl + 4LiBr + (1-x)C_2H_6$$

In some examples, one or more precursors comprise a halide selected from the group consisting of a metal halide, a non-metal halide, an amine, and an amide. For example, the metal halide is selected from the group consisting of titanium tetrachloride ($TiCl_4$), iron (III) chloride ($FeCl_3$), aluminum chloride ($AlCl_3$), and magnesium chloride ($MgCl_2$). The non-metal halide selected from the group consisting of phosphorus trichloride ($PCl_3$), phosphorus pentachloride ($PCl_5$), boron trichloride ($BCl_3$). The amine selected from the group consisting of trimethylamine (($CH_3$)$_3$N) and melamine ($C_3H_6N_6$). The amide can be dimethylformamide ($C_3H_7NO$).

$$SiCl_4 \Rightarrow Si\ (solid) + 2Cl_2\ (gas)$$

$$TiCl_4 \Rightarrow Ti\ (solid) + 2Cl_2\ (gas)$$

Since silicon (Si-solid) and titanium (Ti-solid) are produced at the same time in the same solution, electrochemically active-material structures are formed with chemically dispersed silicon and titanium.

In some examples, one or more precursors comprise one or more oxygen-generating precursors selected from the group consisting of water ($H_2O$), dissolved oxygen, carbon dioxide ($CO_2$), alcohol (e.g., ethanol ($CH_3CH_2OH$)), an oxalate salt (e.g., ammonium oxalate (($NH_4)_2C_2O_4$),), and a nitrate salt (e.g., ammonium nitrate ($NH_4NO_3$)). In these examples, the electrochemically active-material structures 120 further comprise oxygen and/or carbon.

In specific, silicon tetrachloride ($SiCl_4$) can chemically react with ethanol ($CH_3CH_2OH$) resulting in oxygen and/or carbon produced and trapped inside silicon structures:

$$SiCl_4 + 4CH_3CH_2OH => Si(CH_3CH_2O)_4 + HCl \text{ (solution)}$$

$$Si(CH_3CH_2O)_4 => Si\text{(with dispersed O, C)} +$$

$$CH_4/CO/H_2O \text{ (thermal decompose)}$$

Specifically, silicon tetrachloride ($SiCl_4$) can electrochemically be reduced to silicon while nitrate salt can continuously chemically react with the nascent silicon surface to induce oxygen inside silicon structures:

$$SiCl_4 => Si + Cl_2 \text{ (electrolysis)}$$

$$Si + xNO_3^- = SiO_x + xNO_2^-$$

Alternatively, the nitrate can also be electrochemically reduced to release oxygen into the silicon structure.

$$SiCl_4 + xNO_3^- => SiO_x + xNO_2^- + 2Cl_2 \text{ (electrolysis)}$$

In another example, the precursors comprise both trichlorosilane ($HSiCl_3$) and lithium chloride (LiCl), forming an electrolyte together with a solvent. A voltage 2-6V can be used between two electrodes triggering the following reactions:

$$HSiCl_4 => Si \text{ (solid)} + 3/2Cl_2 + HCl \text{ (electrolysis)}$$

$$LiCl => Li \text{ (solid)} + 2Cl_2 \text{ (electrolysis)}$$

In a similar example, the precursors comprise silicon tetrachloride ($SiCl_4$) and lithium chloride (LiCl) to form the electrolyte. A voltage of 2-6V can be used between two electrodes triggering the following reactions:

$$LiCl => Li \text{ (solid)} + 1/2Cl_2 \text{ (electrolysis)}$$

$$SiCl_4 => Si \text{ (solid)} + 2Cl_2 \text{ (electrolysis)}$$

Experimental Results

Various experiments have been conducted to compare the performance of conventional silicon-based lithium-ion electrochemical cells and similar cells in which electrochemically active-material structures comprising both silicon and inert elements, are chemically and/or atomically dispersed within the electrochemically active-material structures. Specifically, in these conventional cells, the electrochemically active-material structures consisted essentially of silicon (e.g., the composition of silicon was greater than 99%). For simplicity, such cells can be referred to as pure-silicon cells. The silicon-only cells can further be physically mixed with conductive carbon and surface coated by a carbon layer. The cells in which both silicon and inert elements were present in the electrochemically active-material structures can be referred to as atomically-dispersed-structures cells.

FIG. 5A illustrates the cycle-life profiles of two cells (1) line 510 represents the cycling data for cells fabricated with pure silicon physically mixed with carbon materials and further coated by carbon coating on the surface (dash-dot line, black), (2) line 520 represents the cycling data for cells fabricated with electrochemically active-material structures containing chemically dispersed silicon and carbon and oxygen from the synthesis process, which has atomically mixed Si, C and O inside the material (solid line, red). The two materials were mixed separately with the same graphite material to form anode slurries with a gravimetric capacity of 450 mAh/g. Corresponding full cells were made with NMC622 cathodes and EC/DEC with 1M $LiPF_6$ electrolyte. The full cells were cycled between 4.2V to 2.8V for capacity retention evaluation. The atomically-dispersed-structures cells (line 520) exceeded the performance of pure silicon cells (line 510) which have already been improved by the carbon physical mixing and surface coating. At the $1000^{th}$ cycle, the atomically-dispersed-structures cells still retained (line 520) more than 80% of their initial capacity while the pure-silicon cells dropped below 80% retention at around the $650^{th}$ cycle.

FIGS. 5B and 5C illustrate the difference in energy-dispersive spectroscopy (EDS) mapping analysis of individual silicon (Si), oxygen (O), and carbon (C) elements in electrochemically active-material structures synthesized such that these elements are chemically dispersed (FIG. 5B) and physical mixture of pure silicon mixed with carbon (FIG. 5C). Dark colors indicate the presence of certain elements in that area. For the chemically dispersed elements, the intensity of silicon (Si), oxygen (O), and carbon (C) aligned well with the shape of the particles. The particle boundaries are identified with lines in all three EDS images (in FIG. 5B) and are the same for all three elements. This indicates that both particles identified in these three EDS images contain silicon (Si), oxygen (O), and carbon (C) elements, i.e., that these elements do not form individual particles with their own defined boundaries.

However, the EDS images of the physical mixture of pure silicon mixed with carbon (in FIG. 5C) show more carbon (C) intensity in the carbon-rich region and more silicon (Si) intensity in the Si-rich region. As such, carbon (C) and silicon (Si) are present in different types of particles (e.g., carbon particles that are free from silicon and silicon particles that are free from carbon). The change of volume expansion of the materials was examined by the swelling ratio test. Both slurries were assembled into half-cell configurations with lithium (Li) and counter/reference electrodes. The full lithiation state was achieved by discharging both half cells to 10 mV vs $Li^+$/Li. The welling ratio of silicon (Si) atomically mixed with carbon (C) is around 34% at the electrode level when fully lithiated while the pure silicon (Si) structures are around 48%.

In another experiment, the change of volume expansion of the materials was examined by comparing atomically-mixed structures ($SiC_aM_bO_cX_d$, $0.1 \le a \le 0.7$, $0 \le b \le 0.2$, $0.1 \le c \le 0.7$, and $0 \le d \le 0.1$, skeletal density=1.9~2.2 $g/cm^3$) with pure silicon structures (Si, skeletal density=2.3 $g/cm^3$). Both types of particles were mixed into slurries with 450 mAh/g designed capacity and assembled into half-cell configurations with Li and counter/reference electrodes. The full lithiation state was achieved by discharging both half cells to 10 mV vs $Li^+/Li$. The swelling ratio of silicon in atomically-mixed structures is around 34% at the electrode level when fully lithiated while the pure silicon cells are around 48% (relative to their unlithiated state). The inert-material loading limit the capacity of the atomically-mixed structures was between 1700 to 2700 mAh/g, while the pure silicon delivers the capacity of 3600 mAh/g. This lithiation degree reduction contributes to the reduced swelling ratio. Also, the decreased skeletal density reduced the swelling ratio by utilizing some pore volume to accommodate the volume expansion.

Figure 5D:
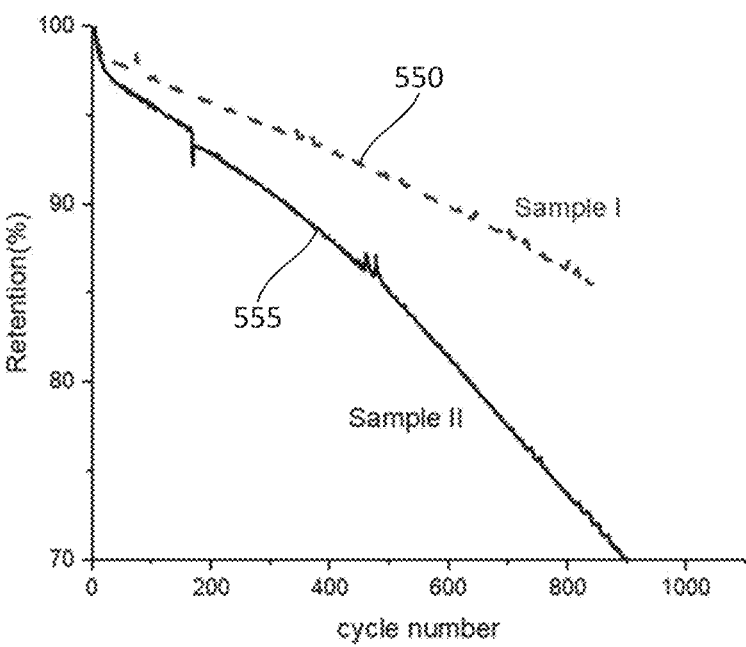
FIG. 5D is a capacity retention plot comparing the performance of electrochemically active-material structures with open and closed pores.

Referring to FIG. 5D, in another test, two atomically-mixed structures were synthesized by electrochemical methods from the mixture of $SiCl_4$ and $CCl_4$ with the same composition ($SiC_aM_bO_cX_d$, $0.1 \le a \le 0.7$, $0 \le b \le 0.2$, $0.1 \le c \le 0.7$, and $0 \le d \le 0.1$) but different pore structures. Sample I (line 550) had mostly closed pores, while Sample II (line 555) had mostly open pores. Specifically, Sample II was further processed by etching and mechanical milling to break the walls of the closed pore to convert the initially closed pores to open pores. Therefore, the surface area of Sample II was about 2-3 times larger than that of Sample I, i.e., measured at 16 $m^2/g$ for Sample II and 6 $m^2/g$ for Sample I. Furthermore, the skeletal density of Sample II (at 2.2 $g/cm^3$) was higher than that of Sample I (at 1.9 $g/cm^3$). These two samples were mixed with graphite with the same ratio separately to form two 500 mAh/g anodes. Corresponding full cells were made with NMC622 cathodes and EC/DEC with 1M $LiPF_6$ electrolyte. The full cells were cycled between 4.3V to 2.8V for capacity retention evaluation with the results presented in FIG. 5D. Sample I (represented by the top dotted line) had higher capacity retention than Sample II (represented by the black solid line). For example, the retained capacity was over 13% higher for Sample I (than for Sample II) after 800 cycles.

Figure 5E:
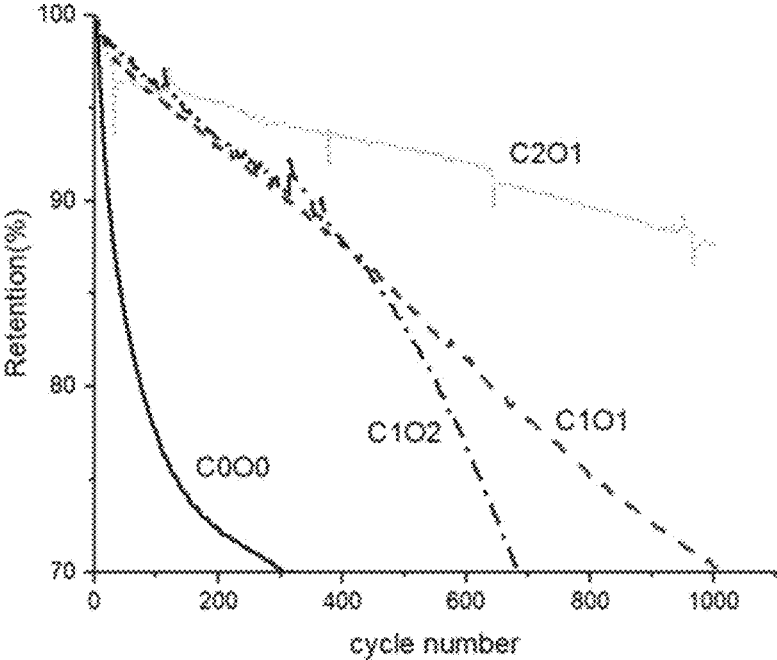
FIG. 5E is a capacity retention plot comparing the performance of electrochemically active-material structures with different composition/atomic ratios of oxygen and carbon.

Referring to FIG. 5E, in yet another test, three samples with similar pore structures and skeletal densities but different compositions were prepared by chemical reduction method with $HSiCl_3$ as the silicon precursor, $CCl_4$ as the carbon precursor, ammonium nitrate as the oxygen precursor, and sodium metal as reducing agent. Specifically, different ratios of C and O precursors were added to adjust the C and O ratio in the material as shown in the following table:

| Sample | "a" in $SiC_aM_bO_cX_d$ Relative to Sample C1O1 | "b" in $SiC_aM_bO_cX_d$ Relative to Sample C1O1 | "c" in $SiC_aM_bO_cX_d$ Relative to Sample C1O1 | "d" in $SiC_aM_bO_cX_d$ Relative to Sample C1O1 |
|---|---|---|---|---|
| C1O1 | 1 | 1 | 1 | 1 |
| C2O1 | 2 | 1 | 1 | 1 |
| C1O2 | 1 | 1 | 2 | 1 |
| C0O0 | 0 | 0 | 0 | 0 |

All four samples were mixed with graphite forming 500 mAh/g anodes. Corresponding full cells were made with NMC622 cathodes and EC/DEC with 1M $LiPF_6$ electrolyte.

The full cells were cycled between 4.3V to 2.8V for capacity retention evaluation. Sample C0O0 without any inter-element doping drops the fastest. Samples C1O1 and C1O2 had a similar initial drop but in the sample with higher oxygen content (C1O2), the capacity drops faster at a later stage (than in C1O1). Sample C2O1 with higher C content decays the slowest. However, because of the high C and O content in C2O1 and C1O2, their first cycle delithiation capacities decrease to 1500~2000 mAh/g range, reducing their deliverable energy densities when compared with sample C0O0 in the 3300~3600 mAh/g range and C1O1 in the 2000~3300 mAh/g range. C1O1 presents the most balanced performance between deliverable capacity and cycling performance.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

The invention claimed is:

1. An electrochemically active-material structure for use in lithium-ion batteries, the electrochemically active-material structure comprising
   silicon in one or more of an amorphous structure and a polycrystalline structure;
   carbon (C);
   oxygen (O); and
   one or more inert elements selected from the group consisting of an additive element (M) and a halogen (X) such that the electrochemically active-material structure has a composition represented by $SiC_a M_b O_c X_d$ with "a" being 0.3-0.7, "b" being 0-2, "c" being 0.3-0.7, and "d" being 0-2, the one or more inert elements are chemically dispersed in the electrochemically active-material structure such that the electrochemically active-material structure is a single-phase structure through an entire volume of the electrochemically active-material structure without forming a separate phase comprising the one or more inert elements.

2. The electrochemically active-material structure of claim 1, wherein the single-phase structure is a polycrystalline structure consisting of domains less than 5 nm in size.

3. The electrochemically active-material structure of claim 1, wherein the single-phase structure is amorphous.

4. The electrochemically active-material structure of claim 1, wherein the electrochemically active-material structure comprises one or more closed pores and atomic vacancies such that the electrochemically active-material structure has a skeletal density of between 0.5 to 2.3 $g/cm^3$.

5. The electrochemically active-material structure of claim 1, wherein the electrochemically active-material structure has a lithium delithiation capacity between 1300 to 3800 mAh/g when delithiated to 2.0V vs $Li^+/Li$ after a full lithiation to 5 mV vs $Li^+/Li$.

6. The electrochemically active-material structure of claim 1, wherein a weight percentage of the silicon in the electrochemically active-material structure is between 9% to 95%.

7. The electrochemically active-material structure of claim 1, wherein:

"a" is 0.4-0.6, and

"c" being 0.4-0.6.

8. The electrochemically active-material structure of claim 1, wherein:

"b" is 0.01-2, and

"d" is 0.01-2.

9. The electrochemically active-material structure of claim 1, wherein the additive element (M) in $SiC_aM_bO_cX_d$ is one or more metal elements selected from the groups consisting of magnesium (Mg), aluminum (Al), titanium (Ti), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), tantalum (Ta), lanthanum (La), sodium (Na), and potassium (K).

10. The electrochemically active-material structure of claim 1, wherein the additive element (M) in $SiC_aM_bO_cX_d$ is one or more dopants selected from the group consisting of hydrogen (H), boron (B), nitrogen (N), phosphorus (P), sulfur (S), arsenic (As), and telluride (Te).

11. The electrochemically active-material structure of claim 1, wherein $0.01 \leq b \leq 0.1$ in $SiC_aM_bO_cX_d$.

12. The electrochemically active-material structure of claim 1, wherein the halogen (X) is selected from the group consisting of fluorine (F) and chlorine (Cl), bromine (Br), and iodine (I).

13. The electrochemically active-material structure of claim 1, wherein "d" is 0.01-0.1.

14. The electrochemically active-material structure of claim 1, wherein "b" is 0.1-2.

15. The electrochemically active-material structure of claim 1, wherein an atomic percentage of the silicon in the electrochemically active-material structure is between 50% to 95%.

16. The electrochemically active-material structure of claim 1, wherein a total atomic percentage of all the inert elements is lower than 91% in any 1 nm by 1 nm by 1 nm portion of the entire volume.

17. The electrochemically active-material structure of claim 1, wherein an atomic percentage of the silicon in the electrochemically active-material structure is between 9% to 50%.

18. The electrochemically active-material structure of claim 1, wherein an atomic percentage of the silicon is higher than 9% in any 1 nm by 1 nm by 1 nm portion of the entire volume.

19. The electrochemically active-material structure of claim 1, wherein the electrochemically active-material structure has at least one Raman shift selected from a group of 450-470 $cm^{-1}$ and 515-525 $cm^{-1}$.

* * * * *